US011355024B2

(12) United States Patent
Breed

(10) Patent No.: US 11,355,024 B2
(45) Date of Patent: Jun. 7, 2022

(54) METHODS FOR ADMINISTERING AND TAKING A TEST EMPLOYING SECURE TESTING BIOMETRIC TECHNIQUES

(71) Applicant: Intelligent Technologies International, Inc., Miami Beach, FL (US)

(72) Inventor: David S Breed, Miami Beach, FL (US)

(73) Assignee: Intelligent Technologies International, Inc., Miami Beach, FL (US)

( * ) Notice: Subject to any disclaimer, the term of this patent is extended or adjusted under 35 U.S.C. 154(b) by 128 days.

(21) Appl. No.: 16/740,748

(22) Filed: Jan. 13, 2020

(65) Prior Publication Data

US 2020/0152075 A1   May 14, 2020

Related U.S. Application Data

(63) Continuation of application No. 15/467,733, filed on Mar. 23, 2017, now Pat. No. 10,540,907, which is a
(Continued)

(51) Int. Cl.
*G09B 7/077* (2006.01)
*G09B 7/00* (2006.01)
(Continued)

(52) U.S. Cl.
CPC ......... *G09B 7/077* (2013.01); *G02B 27/0093* (2013.01); *G02B 27/017* (2013.01);
(Continued)

(58) Field of Classification Search
CPC . G09B 7/02; G09B 7/00; G09B 7/077; G09B 2027/0187; G09B 2027/0138;
(Continued)

(56) References Cited

U.S. PATENT DOCUMENTS 4,593,384 A   6/1986 Kleijne
5,291,243 A   3/1994 Heckman et al.
(Continued)

FOREIGN PATENT DOCUMENTS

CN   103108163 A   5/2013
CN   103136510 A   6/2013
(Continued)

OTHER PUBLICATIONS

Search Report and Written Opinion for PCT/US2015/056710 dated Jan. 15, 2016.
(Continued)

*Primary Examiner* — Aneeta Yodichkas
(74) *Attorney, Agent, or Firm* — Brian Roffe

(57) ABSTRACT

Methods for administering and taking a test using a headpiece supported on a person's head. A test is directed to the headpiece and includes real displays. A sequence of the real displays and fake displays are displayed on a display in front of the person's face. An encrypted code is provided, which when decrypted, provides places of the real displays in the display sequence. The encrypted code is decrypted to obtain the places of the real displays in the display sequence. A light valve assembly in the viewing portion is controlled to assume, when a real display is being displayed, a first state in which the person is able to view the display through the light valve assembly and thus the real display and assume, when a fake display is being displayed, a second state in which the person is prevented from viewing the display through the light valve assembly.

20 Claims, 11 Drawing Sheets

Related U.S. Application Data continuation of application No. 15/329,243, filed as application No. PCT/US2015/045846 on Aug. 19, 2015, now Pat. No. 9,959,777, said application No. 15/467,733 is a continuation-in-part of application No. 14/448,598, filed on Jul. 31, 2014, now abandoned.

(60) Provisional application No. 62/040,806, filed on Aug. 22, 2014.

(51) Int. Cl.
*G06F 3/01* (2006.01)
*G06F 21/86* (2013.01)
*G06F 21/88* (2013.01)
*G06F 21/32* (2013.01)
*G06F 21/62* (2013.01)
*G06F 21/84* (2013.01)
*G02B 27/01* (2006.01)
*G02B 27/00* (2006.01)
*H04R 29/00* (2006.01)
*G06V 40/19* (2022.01)
*G06V 40/18* (2022.01)

(52) U.S. Cl.
CPC ............ *G06F 3/013* (2013.01); *G06F 21/32* (2013.01); *G06F 21/6209* (2013.01); *G06F 21/84* (2013.01); *G06F 21/86* (2013.01); *G06F 21/88* (2013.01); *G06V 40/19* (2022.01); *G06V 40/193* (2022.01); *G09B 7/00* (2013.01); *G02B 2027/0138* (2013.01); *G02B 2027/0178* (2013.01); *G02B 2027/0187* (2013.01); *G06F 2221/2151* (2013.01); *H04R 29/004* (2013.01); *H04R 2499/15* (2013.01)

(58) Field of Classification Search
CPC . G09B 2027/0178; G06F 21/86; G06F 21/88; G06F 21/32; G06F 21/6209; G06F 21/84
See application file for complete search history.

(56) References Cited

U.S. PATENT DOCUMENTS

| | | |
|---|---|---|
| 5,565,316 A | 10/1996 | Kershaw et al. |
| 5,629,984 A | 5/1997 | McManis |
| 5,909,589 A | 6/1999 | Parker et al. |
| 5,947,747 A | 9/1999 | Walker et al. |
| 6,023,372 A | 2/2000 | Spitzer et al. |
| 6,112,049 A | 8/2000 | Sonnenfeld |
| 6,320,610 B1 | 11/2001 | Van Sant et al. |
| 6,529,209 B1 | 3/2003 | Dunn et al. |
| 6,532,298 B1 | 3/2003 | Cambier et al. |
| 6,665,428 B1 | 12/2003 | Gozzini |
| 6,853,293 B2 | 2/2005 | Swartz et al. |
| 7,054,162 B2 | 5/2006 | Benson et al. |
| 7,069,586 B1 | 6/2006 | Winneg et al. |
| 7,257,557 B2 | 8/2007 | Hulick |
| 7,278,734 B2 | 10/2007 | Jannard et al. |
| 7,281,667 B2 | 10/2007 | Farooq et al. |
| 7,472,836 B2 | 1/2009 | Farooq et al. |
| 7,551,098 B1 | 6/2009 | Chock et al. |
| 7,758,911 B2 | 7/2010 | Heffner |
| 7,791,809 B2 | 9/2010 | Filipovich et al. |
| 7,792,552 B2 | 9/2010 | Thomas et al. |
| 7,806,341 B2 | 10/2010 | Farooq et al. |
| 8,020,220 B2 | 9/2011 | McElroy et al. |
| 8,020,989 B2 | 9/2011 | Jannard et al. |
| 8,165,347 B2 | 4/2012 | Heinzmann et al. |
| 8,203,502 B1 | 6/2012 | Chi et al. |
| 8,223,024 B1 | 7/2012 | Petrou |
| 8,233,672 B2 | 7/2012 | Matos |
| 8,467,133 B2 | 6/2013 | Miller |
| 8,472,120 B2 | 6/2013 | Border et al. |
| 8,477,425 B2 | 7/2013 | Border et al. |
| 8,482,859 B2 | 7/2013 | Border et al. |
| 8,488,246 B2 | 7/2013 | Border et al. |
| 8,649,530 B2 | 2/2014 | Kim et al. |
| 8,696,113 B2 | 4/2014 | Lewis |
| 8,713,130 B2 | 4/2014 | Logan et al. |
| 8,733,927 B1 | 5/2014 | Lewis |
| 8,733,928 B1 | 5/2014 | Lewis |
| 8,750,558 B2 | 6/2014 | Lee et al. |
| 8,814,691 B2 | 8/2014 | Haddick et al. |
| 8,915,744 B2 | 12/2014 | Srinivasan et al. |
| 8,926,335 B2 | 1/2015 | Kumar et al. |
| 8,963,806 B1 * | 2/2015 | Starner .................. G06F 21/32 345/8 |
| 9,202,443 B2 | 12/2015 | Perez et al. |
| 9,280,907 B2 | 3/2016 | Dorman |
| 9,552,738 B2 | 1/2017 | Cano et al. |
| 9,763,613 B2 | 9/2017 | Sheperd et al. |
| 9,870,713 B1 * | 1/2018 | Ducrou .................. G06Q 50/20 |
| 9,928,510 B2 | 3/2018 | Matos |
| 2002/0130673 A1 | 9/2002 | Pelrine et al. |
| 2002/0130821 A1 | 9/2002 | Bronson |
| 2002/0186838 A1 | 12/2002 | Brandys |
| 2002/0196554 A1 | 12/2002 | Cobb et al. |
| 2003/0009683 A1 | 1/2003 | Schwenck et al. |
| 2003/0009684 A1 | 1/2003 | Schwenck et al. |
| 2003/0059078 A1 | 3/2003 | Downs, Jr. et al. |
| 2004/0101178 A1 | 5/2004 | Fedorovskaya et al. |
| 2004/0177658 A1 | 9/2004 | Mitchell |
| 2004/0229199 A1 | 11/2004 | Ashley et al. |
| 2005/0201585 A1 | 9/2005 | Jannard et al. |
| 2006/0152360 A1 | 7/2006 | Vatsaas et al. |
| 2007/0052672 A1 | 3/2007 | Ritter et al. |
| 2007/0067119 A1 | 3/2007 | Loewen et al. |
| 2008/0089545 A1 | 4/2008 | Jannard et al. |
| 2008/0104618 A1 | 5/2008 | Rogers et al. |
| 2008/0131860 A1 * | 6/2008 | Redd .................. G09B 7/00 434/350 |
| 2008/0285801 A1 | 11/2008 | Heinzmann et al. |
| 2009/0008459 A1 | 1/2009 | Mainguet |
| 2009/0087827 A1 | 4/2009 | Goldburd |
| 2009/0097688 A1 | 4/2009 | Lewis |
| 2009/0220088 A1 * | 9/2009 | Lu .................. G06F 21/554 380/277 |
| 2009/0231722 A1 | 9/2009 | Filipovich et al. |
| 2010/0097215 A1 | 4/2010 | Locher |
| 2010/0171202 A1 | 7/2010 | Tian et al. |
| 2010/0180350 A1 | 7/2010 | Glaubert |
| 2010/0182020 A1 | 7/2010 | Thornley et al. |
| 2010/0315720 A1 | 12/2010 | Filipovich et al. |
| 2010/0327856 A1 | 12/2010 | Lowy |
| 2011/0031982 A1 | 2/2011 | Leon et al. |
| 2011/0103585 A1 | 5/2011 | Tuck et al. |
| 2011/0169932 A1 | 7/2011 | Mula et al. |
| 2011/0187523 A1 | 8/2011 | Edelstein et al. |
| 2011/0197327 A1 | 8/2011 | McElroy et al. |
| 2011/0207108 A1 * | 8/2011 | Dorman .................. G09B 7/00 434/350 |
| 2011/0227603 A1 | 9/2011 | Leon et al. |
| 2011/0244440 A1 | 10/2011 | Saxon et al. |
| 2011/0279228 A1 | 11/2011 | Kumar |
| 2012/0062241 A1 | 3/2012 | Rossi et al. |
| 2012/0062444 A1 | 3/2012 | Cok et al. |
| 2012/0063046 A1 | 3/2012 | Rossi et al. |
| 2012/0068914 A1 | 3/2012 | Jacobsen et al. |
| 2012/0077177 A1 * | 3/2012 | Foster .................. G09B 7/02 434/362 |
| 2012/0088223 A1 * | 4/2012 | Walker .................. G09B 7/02 434/362 |
| 2012/0176220 A1 | 7/2012 | Garcia |
| 2012/0212414 A1 | 8/2012 | Osterhout et al. |
| 2013/0081127 A1 | 3/2013 | Chen |
| 2013/0127980 A1 | 5/2013 | Haddick et al. |
| 2013/0135196 A1 * | 5/2013 | Park .................. G06F 3/012 345/156 |
| 2013/0169683 A1 | 7/2013 | Perez et al. |
| 2013/0278631 A1 | 10/2013 | Border et al. |
| 2013/0286053 A1 | 10/2013 | Fleck et al. |

(56) References Cited

U.S. PATENT DOCUMENTS

| | | | |
|---|---|---|---|
| 2014/0030686 A1* | 1/2014 | Stambaugh | G09B 5/00 |
| | | | 434/322 |
| 2014/0085452 A1 | 3/2014 | Nistico et al. | |
| 2014/0114148 A1* | 4/2014 | Shepherd | A61B 3/113 |
| | | | 600/301 |
| 2014/0138447 A1 | 5/2014 | Goldman et al. | |
| 2014/0267420 A1 | 9/2014 | Schowengerdt et al. | |
| 2015/0037781 A1 | 2/2015 | Breed et al. | |
| 2015/0193651 A1* | 7/2015 | Gleim | G06K 9/00288 |
| | | | 382/118 |
| 2015/0279220 A1 | 10/2015 | Ming et al. | |
| 2016/0035233 A1 | 2/2016 | Breed | |
| 2016/0180170 A1 | 6/2016 | Auger et al. | |
| 2016/0307451 A1 | 10/2016 | Dorman | |
| 2016/0309081 A1 | 10/2016 | Frahm et al. | |
| 2017/0185805 A1 | 6/2017 | Breed et al. | |
| 2017/0213471 A1 | 7/2017 | Breed | |
| 2018/0357916 A1 | 12/2018 | Breed et al. | |

FOREIGN PATENT DOCUMENTS

| | | |
|---|---|---|
| EP | 0128672 A1 | 12/1984 |
| EP | 1175498 B1 | 7/2005 |
| JP | 2009237801 A | 10/2009 |
| JP | 2017-156410 A | 9/2017 |
| WO | 2015148607 A1 | 10/2015 |
| WO | 2016028864 A1 | 2/2016 |

OTHER PUBLICATIONS

International Search Report for PCT/US2015/045846 dated Dec. 7, 2015.
Written Opinion for PCT/US2015/045846 dated Dec. 7, 2015.
International Search Report for PCT/US15/22390 dated Jul. 29, 2015 with Written Opinion.
Search report for International Application No. PCT/US19/22951 dated Jun. 7, 2019.
Written opinion for International Application No. PCT/US19/22951 dated Jun. 7, 2019.

\* cited by examiner

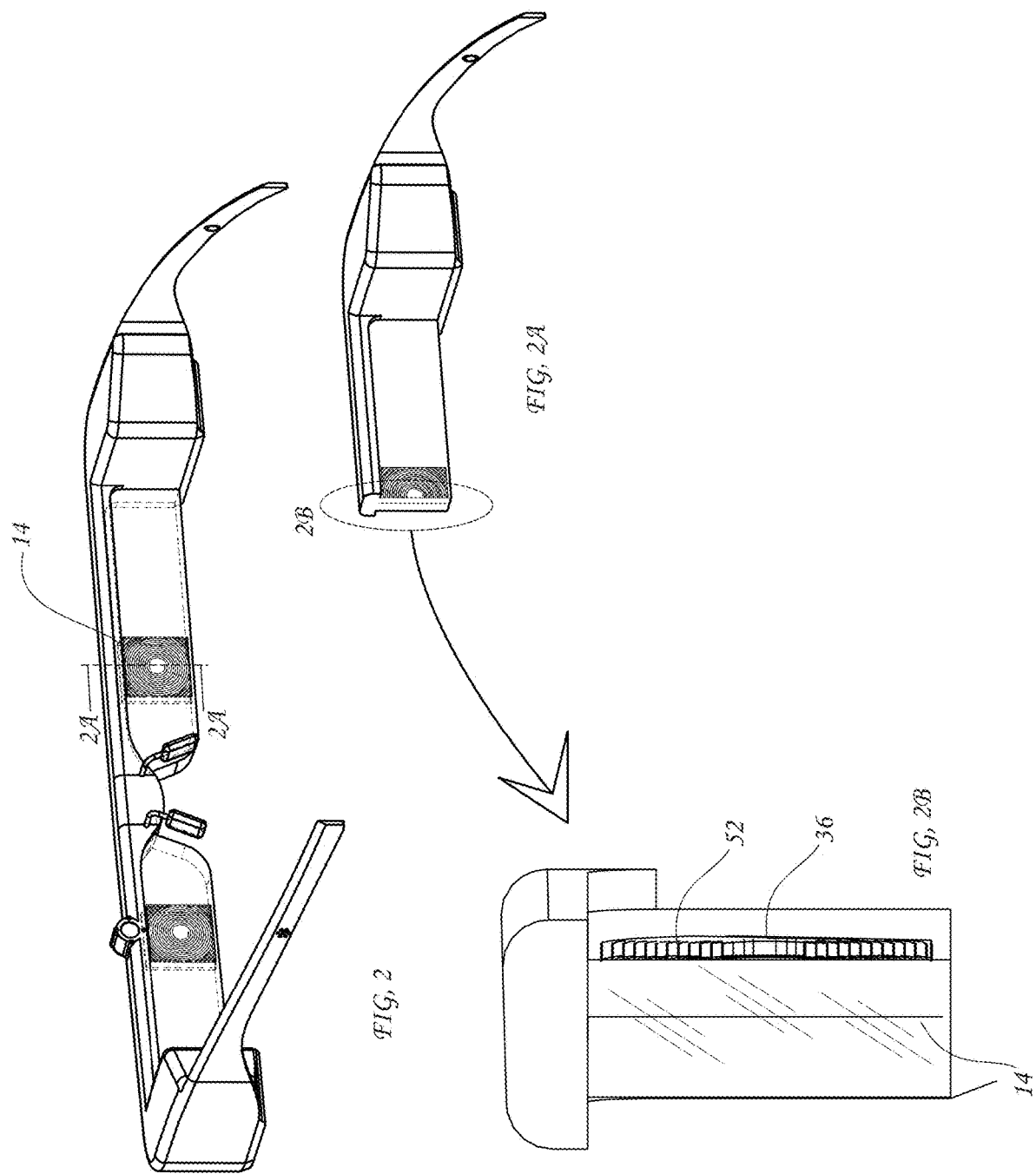

METHODS FOR ADMINISTERING AND TAKING A TEST EMPLOYING SECURE TESTING BIOMETRIC TECHNIQUES

CROSS REFERENCE TO RELATED APPLICATIONS

This application is a continuation of U.S. patent application Ser. No. 15/467,733 filed Mar. 23, 2017, now U.S. Pat. No. 10,540,907, which is a continuation-in-part of U.S. patent application Ser. No. 14/448,598 filed Jul. 31, 2014, now abandoned, and which is a continuation-in-part of U.S. patent application Ser. No. 15/329,243 filed Jan. 25, 2017, now U.S. Pat. No. 9,959,777, which is a National Stage filing of International Application No. PCT/US15/45846 filed Aug. 19, 2015, now expired, which claims the benefit of U.S. provisional patent application Ser. No. 62/040,806 filed Aug. 22, 2014, all of which are incorporated by reference herein.

FIELD OF THE INVENTION

The present disclosure relates to the field of a computer-based system and method for taking a test while ensuring that the test-taker is not receiving assistance from another person while taking the test and optionally ensuring that the device being used for viewing or taking the test has not been and is not being tampered with or otherwise compromised. Additionally, the present invention relates to the field of glasses which permit the test-taker to view specific content on a computer display which is not viewable by others without special glasses. Nevertheless, the glasses are not limited to test-taking and can be used for selective viewing applications.

BACKGROUND OF THE INVENTION

There has been a great deal of discussion in the press over the past several years relating to MOOCs, Massive Open Online Courses. Using the Internet and readily available textbooks, education can be cheaply distributed to anyone who has Internet access. It is now generally recognized that mastery of almost any field taught in colleges and universities can be achieved by a motivated student without attending lectures at that college or university. Thus, the technology is in place for any student to obtain knowledge that has previously only been available to a campus-resident, matriculated student at a college, university or other institution at virtually no cost other than the cost of textbooks.

In contrast, the cost of a traditional Massachusetts Institute of Technology (MIT) education, for example, resulting in a bachelor's degree can greatly exceed one hundred thousand dollars. The only impediment which exists from preventing a university such as MIT from granting a degree to such a student is that the university needs to know with absolute certainty that the student did not cheat when taking the various exams required to demonstrate mastery of the coursework. With a degree from MIT, for example, industry will hire such a person at a starting salary approaching or exceeding $100,000 per year. Thus, the value to the student is enormous. Since the information which must be mastered is now available in readily available textbooks and for free through MOOCs on the Internet, the only impediment separating a motivated student from a high starting salary is that a degree-granting university must be certain that the student has demonstrated mastery of the material through successful completion of examinations.

As generally used herein, a "test" is any type of question-based application that requires analysis by a person taking the test and a response from this person. A test may therefore be considered an examination, a quiz, an assessment, an evaluation, a trial and/or an analysis.

SUMMARY OF THE INVENTION

The present disclosure is directed partly at solving the problem of guaranteeing, with a high degree of certainty, that a student taking a test is acting alone without the aid of a consultant or otherwise cheating. One technique to achieve this is to use a headpiece with a biometric identification feature.

A headpiece used in the invention includes a frame having support structure for supporting the frame on a person's head and a viewing portion configured to be in front of the person's face when the frame is supported on the person's head, and at least one light valve assembly arranged in the viewing portion. Each light valve assembly has a first state in which the person is able to see therethrough when the frame is supported on their head and an alternative second state in which viewing through the light valve assembly is prevented. A biometric identification system is arranged on the frame and periodically obtains biometric data about the person. A controller or processor, generally referred to as a processing unit, is coupled to each light valve assembly and the biometric identification system and controls whether each light valve assembly is in the first state or the second state based in part on analysis of the biometric data obtained by the biometric identification system to thereby control viewing through each light valve assembly.

In one embodiment, each light valve assembly allows light transmission therethrough only in a limited angular range to enable the person to see through the light valve assembly when the frame is supported on the person's head and to prevent viewing through the light valve assembly by a person other than the person on which the frame is supported when the frame is supported on the person's head. The light valve assembly may be situated rearward of part of the viewing portion. The support structure includes a nosepiece configured to support the frame on a nose of the person. The viewing portion has a first viewing portion on one side of the nosepiece and a second viewing portion on an opposite side of the nosepiece. There is one light valve assembly in the first viewing portion and another in the second viewing portion. Each light valve assembly may include concentric cylinders spaced apart from one another a distance to provide the angular range of, for example, 30 degrees centered about an axis passing through a central axis of the concentric cylinders.

A biometric scan camera, as one type of biometric identification system, obtains images of an area around an eye of the person on which the frame is supported. More particularly, an iris or retinal scan camera, as another form of a biometric identification system, may obtain images of an iris or retina of an eye of the person on which the frame is supported. A change in biometric data during a test is considered as evidence of cheating on the test.

One aspect is to prevent access to a device which the student is using to take a test. A method for detecting an attempt to physically alter an electronic device in accordance with the invention is a type of chassis intrusion detector. In the method, the device, such as glasses used for viewing the test during test-taking, is enclosed in a thin film containing conductive wires which are positioned to surround the device (i.e., not part of the internal wiring of the device). Impedance of the wires is monitored by means of a security assembly (e.g., resistance and/or mutual inductance between a pair of wires). When a change in impedance is detected by the security assembly, a required security code needed for use of the device is deleted. In a preferred embodiment, the device is a glasses assembly being used for test-taking and thus with the method incorporated into the device, secure test taking is provided.

The security assembly includes a processor, a power source for providing power to the processor and a RAM assembly containing a required security code for use of the device for test-taking purposes. The security assembly is configured such that any attempt to disassemble the security assembly will break one or more wires connecting the power source to the processor and such that a change in impedance relative to a threshold will cause the security code to be erased from the RAM assembly. The security assembly may be coupled to the device using a port of the device. Apertures are provided in the envelope defined by the films in which the device is placed, the apertures having a size and location allowing for power and information to be transmitted to the device. The films are preferably transparent at portions that overlie a display of the device.

Another aspect of the invention is a method for limiting viewing of content on a display, e.g., a test which constitutes a series of test questions displayed on the display, using the viewing device as described above including or incorporating the light valve assembly(ies). A display presents a test to the person when the frame is supported on the person's head, at least one user interface receives input from the person when the frame is supported on the person's head to start and proceed through the questions, and a processor is coupled to each user interface, the display and each light valve assembly and controls content of the display based on input received via the user interface(s) and controls whether each light valve assembly is in the first state or the second state dependent on content of the display, Or vice versa, to thereby control viewing through each light valve assembly.

BRIEF DESCRIPTION OF THE DRAWINGS

The following drawings are illustrative of embodiments of the system developed or adapted using the teachings of at least one of the embodiments disclosed herein and are not meant to limit the scope of the disclosure as encompassed by the claims.

FIG. 2 is a detailed drawing of the LCD or other light-valve based display section of the apparatus shown in FIG. 1A which includes a field of view controller.

FIG. 2A is a view of a section removed from FIG. 2.

FIG. 2B illustrates the field of view control mechanism.

DETAILED DESCRIPTION OF THE INVENTION

For a general background of this invention, see WO2016028864 Secure testing device, system and method, which is incorporated herein by reference in its entirety.

Figures 1A, 1B:
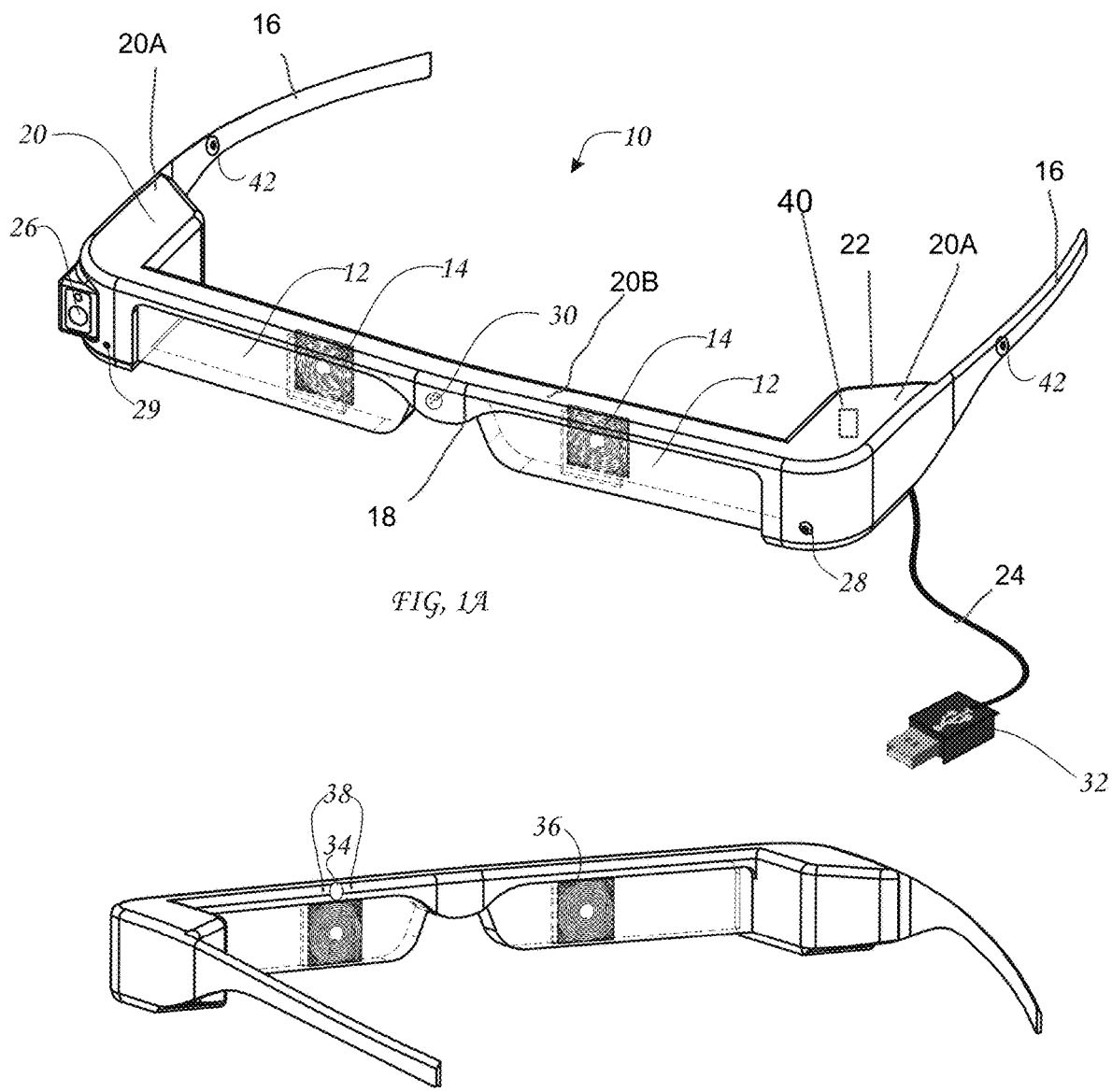
FIG. 1A is a perspective view of a head worn glasses type device containing an electronics assembly with several sensors, cameras and lenses all protected with a chassis intrusion detector prepared using the teachings of this disclosure.
FIG. 1B is a perspective view of the apparatus of FIG. 1A seen from the rear.

Referring now to FIGS. 1A and 1B, this embodiment does not require a special laptop or other special computer to facilitate secure test-taking. Rather, in this embodiment, the test-taker can use a desktop or laptop computer, smartphone, tablet or other non-specialized computing device which is compatible with the teaching institution's systems. However, other components are required including a head-mounted apparatus or viewing glasses.

FIG. 1A illustrates one implementation of the invention, shown generally at 10, which includes view control glasses 12. The view control glasses 12 comprise a viewable window or light valve assembly 14 which is part of one or both glasses lenses, i.e., viewing portions present on either side of a nosepiece that may be made of a transparent material such as glass or a suitable plastic. The light valve assembly 14 controls transmission of light through the lenses, a transparent glass or plastic element of the viewing portion, to the eyes of the test-taker. Light valve assembly 14 can comprise an OLED, LCD, Pockels, Kerr cell or other light valve technology. Its purpose is to alternately allow light to be transmitted to the eyes of the test-taker when the glasses 12 are supported on their head and the nosepiece on their nose, or to block it as described below.

A controller or processor 40 controls the light valve assemblies 14 to alternatively allow light passage or prevent light passage, but not provide both at the same time. The light valve assemblies 14 thus have a first light-transmitting state and a second light-blocking or light-blanking state, and switch or change between states based on control by the controller. When used with a display for test-taking, the content of the display (120, see FIG. 3) is correlated to the state of the light valve assemblies 14 so that the person wearing the glasses 12 is able to see test questions destined for their viewing while other content not destined for their viewing is blocked from them.

To assure that the test-taking student is not receiving assistance from a consultant, it has been disclosed in other patent applications of the current assignee, that the consultant must not know the contents of the test questions since there is an unlimited number of methods where, having learned a question, the consultant can communicate answers to the test-taker. Thus, to prevent cheating, the consultant must be denied access to the questions. One method of achieving this goal and to still allow use of a general viewable display is to scramble the contents of the display and then to provide a filter on a set of glasses worn by the student which unscrambles the content allowing only the student to see the test questions. One method of accomplishing the goal is to create a sequence of very similar displays where the real one is displayed in a mixture of fake displays. A viewer capturing the sequence of displays cannot distinguish the real one from others in the series. However, an encrypted code as to the places in the sequence that the "real" display content appears (that destined or intended to be viewed by the test-taker) can be sent to the student's glasses where it is decrypted and used to control the light valve assembly 14, allowing only transmission of the real test question to pass to the student's eyes. Even if the real test only occurs on 5% of the scenes, the student will be able to read the test whereas other viewers will be denied a coherent view. The sequence may be a number of a frame within a set of frames that correlate to the real test question. For example, the display may display the real test question at the fifth frame within each ten frames, and thus the sequence would be, 5, 15, 25, 35, etc. A random number of the frame within a fixed number of frames is more ideal.

A device constructed in accordance with the teachings of this invention is illustrated in FIG. 1A which is a perspective view of a head-worn glasses type device, referred to as test glasses, containing an electronics assembly with several sensors, cameras and field of view (FOV) controlled lenses are all protected with a chassis intrusion detector (CID) prepared using the teachings herein. A head-worn glasses and electronics device constructed in accordance with the invention is shown generally at 10 in FIG. 1A.

Test glasses device 10 comprise a frame 22 having two temples 16 configured to be supported on the wearer's ears and a nosepiece 18 configured to be supported on the wearer's nose, and a housing 20 that extends from the frame 22. Housing 20 is substantially C-shaped with first portions 20A extending straight outward from an edge of the frame 22 and a second, middle portion 20B perpendicular to the first portions 20A and positioned extending behind the frame 22.

Either one or both eyes, as shown, can be allowed for the test-taker to view the display and the selected test questions through the light valve controlled lenses, i.e., through light valve assembly 14.

A forward viewing camera 26, representative of an imaging device, is also arranged on or in the housing 20, i.e., the second portion 20B on the right as shown in FIG. 1A, and monitors the field of view of the test-taker outward from the device 10. Alternatively or additionally, a forward viewing camera 26 can be provided on the second portion of the housing 20 on the left. The camera 26 can have a field of view of approximately 120°. Sound-detecting sensors, e.g., a pair of microphones 28 and 29, are also arranged on or in housing 20, one on each second portion, and monitor talking or other sounds which can take place while the test is in progress and the device 10 is on the head of the test-taker. Two, or more, microphones 28 and 29 are provided so that the location of the sound source in a vertical plane can be determined by processor 40. No sound is permitted to be emanating from the mouth of the test-taker which could indicate an attempt of the test-taker to communicate information about a test question to a consultant. If talking by the test-taker is detected by microphones 28 and 29, display of the test can be stopped by processor 40 and an indication of failure of the test generated by processor 40. More generally, at least one action is taken when cheating is detected, either by improper sound detection or other improper action, and this action may include associating an indication of invalidity to the test being displayed and/or with the test-taker, and activating a notification system providing an indication that the person on which the frame 22 is supported is cheating on the test being displayed.

In some implementations, a third microphone, not shown, may be implemented so that the exact location of a sound source can be determined by processor 40. A sound maker/generator or speaker 30 is arranged on or in the frame 22 or housing 20 and periodically provides a sound detectable by the microphones 28 and 29 to enable verification by processor 40 that the microphones 28, 29 have not somehow been rendered inoperable. The manner in which this is done is known to those skilled in the art and disclosed in earlier applications to the inventor and current assignee.

Each of these components 14, 26, 28, 29 and 30 is connected to a processor-containing electronics package (including processor 40) in housing 20 which is mounted to the frame 22 in a manner known to those skilled in the art to which this invention pertains. A cable 24 emanates from the electronics package in housing 20 and can contain a USB connector 32 for connecting onto an external device such as a computer (see FIG. 1A).

An iris or retinal scan camera 34 is arranged on housing 20, pointing inward toward the wearer preferably from a location above one of the light valve assemblies 14 as shown in FIG. 1B, and measures facial biometrics of the test-taker. Such biometrics can include an iris or retinal scan or a scan of the portion of the face surrounding the eye, but are not so limited. As such, scan camera 34 should be considered as a biometric scan camera capable of scanning various at least one biometric feature of the test-taker. Illumination of the eye can be provided by LEDs 38 arranged on the housing 20 and/or frame 22, possibly at a location above the light valve assembly 14 alongside the biometric scan camera 34, which can be in the IR or visible portions of the electromagnetic spectrum. Two or more different levels of visible illumination can be provided by LEDs 38 to cause the iris to be seen at different openings to check for an artificial iris painted onto a contact lens. The scan camera 34 and LEDs 38 are shown arranged on the left housing portion (see FIG. 1A) but could alternately be placed on the right portion or on both portions. The scan camera 34 and LEDs 38 are also connected to the processor-containing electronics package in housing 20 by a wire or wirelessly.

The FOV device prevents a camera which may be mounted to the face of the test-taker, or other location, from capturing the image on the display (on which the test is being displayed in front of the person wearing the device 10) through the light valve assemblies 14.

Software and a processor which controls administration of tests is resident on the external computer, in the electronics package in housing 20, and/or in another device, not shown, which attaches to the device 10 through connector 32 (or partly in multiple ones of these components). A test-taker will have access to one or more user interfaces, for example, a keyboard and/or a mouse, for interacting with this computer, not shown (but shown in FIG. 3 described below). Using a keyboard, the test-taker can initiate the test-taking process through communication with the test-provider. When the test is ready for execution by the test-taker, an encrypted version of the test's display sequence code is transmitted to the computer and relayed to the device 10. The electronics package in housing 20, e.g., including the processor 40, utilizes a private decryption key to decrypt the image sequence of the test questions and cause them to be appropriately viewable on a display in front of the person wearing the device 10 through the light valve assembly 14. The light valve assembly 14 is thus controlled dependent on the content of the display, and vice versa, to enable viewing of the test questions by the test-taker and only by the test-taker since the same image sequence of test questions would be needed to view the same test questions as the test-taker. The test-taker then enters the answers to the questions using the keyboard and the computer display.

The test is preferably configured such that the answers do not provide information relative to the question. Therefore, someone viewing the answers cannot discern therefrom the questions. As such, the question answers do not need to be encrypted, but can be sent in an unencrypted form to the test-providing institution or other test result analysis entity.

For example, if the test-providing institution is providing tests to 1000 test-takers either simultaneously or at different times, and if the test is of a multiple-choice type and contains 50 questions, the order of the questions can be different for each test provided. Since this provides a very large number of different tests, each containing the same questions, there is little risk that answers from one set of questions can be of any value to a test-taker taking a different ordered set of the same questions.

The entire electronics package, the light valve and FOV control devices of the device 10 are encapsulated in a thin film called a chassis intrusion detection film. This film can comprise two conductive layers separated by thin layers of plastic. The electronics package in housing 20 can contain a processor or structure providing processing capability for measuring the capacitance between the two conductive layers. If this capacitance is changed, as might happen if someone attempts to break into the electronics package, then the event can be detected through a change in this property. Alternatively, an array of wires can be printed onto a plastic film either before or after it has encapsulated the electronics package in housing 20 in such a manner that any attempt to break into the housing 20 will sever or otherwise disrupt one or more of the wires. The wires can be made from indium tin oxide and thus be transparent. The wires can be thin, such as about 0.005 inches wide, and have a similar spacing.

The private key for decoding the test question sequence, and any other commands sent by the test-providing institution, can be held in volatile RAM memory in, for example, housing 20 which is kept alive through an extended life (10 years) battery which also can be recharged when the device 10 is connected to the host computer through connector 32. If the chassis intrusion detector system detects an attempt to break in to the device 10 or specifically housing 20, then the power to the RAM memory will be shut off and the private key permanently lost.

When the test-taker is preparing to take a test, he or she will place the device 10 onto his or her head. When this happens for the first time, attributes of the retinal, iris or other biometric scan via biometric scan camera 34 will be recorded in memory in housing 20 for later comparison. When this is accomplished, a signal can be sent to the computer or processor 40 indicating that the test-taker is ready to take the examination. When the test-taker later takes a second test, a new biometric scan will be conducted using biometric scan camera 34 to ascertain that this is the same person who originally registered using this device 10. If this scan comparison, e.g., performed using the processor 40 in electronics package in housing 20, is successful, then the display and light valve assembly 14 will be activated and a signal can be generated and/or sent by the processor 40 to the test-provider via the external computer to forward the encrypted test.

One or more heartbeat monitors 42 can also be added as a further biometric check on the identity of the test-taker. Shape of a person's heartbeat, if analyzed properly, can be used as another biometric identifier.

An alternate biometric uses the test-taker's fingerprint for the initial sign on to the test taking process. This design can make use of the tablet rear camera, or other camera or fingerprint sensor attached to the computer, and the test-taker places his or her finger at a directed position and the finger is photographed or the fingerprint is otherwise obtained through one of the many methods known in the industry. This theoretically could also be fooled by the use of a picture so the finger can be monitored over a few seconds to determine that a pulse is present using methods such as amplifying the motion or the color of the finger as disclosed in: "Software Detects Motion that the Human Eye Can't See", Conor Myhrvold, MIT Technology Review, Jul. 24, 2012; "Seeing the human pulse", Larry Hardesty, MIT News Office, Jun. 19, 2013; and, "Guha Balakrishnan, Fredo Durand, John Guttag, Detecting Pulse from Head Motions in Video, presented at the IEEE Computer Vision and Pattern Recognition conference, 2013. More of the finger print information including the presence of a heartbeat and even the shape of the heartbeat can be captured by this method making it more accurate and difficult to fool than conventional fingerprint scanners.

For this feature, the fingerprint sensor is attached to the computer having the display displaying the test, or may even be provide on the frame 22 or housing 20, and the test-taker is directed to put their finger onto the sensor. The pulse of the test-taker is measured in order to determine that the finger is part of a living human. At the same time, the fingerprint is analyzed for biometric security purposes. Thus, the processor 40 may be configured to interact with the fingerprint sensor to simultaneously perform biometric analysis and a live person verification via the same fingerprint sensor. It is possible to take the fingerprint for analysis to confirm the identity of the test-taker and verify that the source of the fingerprints is a live person at the same time using the same device.

The scan camera 34 is controlled by the processor-containing electronics package in housing 20 to periodically check to ascertain that the test-taker's iris is present and that it has not changed. If anything anomalous occurs, such as the absence of an iris or the change of an iris, then the light valve assembly 14 will be deactivated by the processor 40. Thus, when the test-taker removes the device 10, the light valve assembly 14 will automatically stop filtering the test questions. Similarly, if the test-taker transfers the device 10 to another person whose iris does not match that of the test-taker, then the light valve assembly 14 will not allow the test questions to be viewed therethrough (it will block or blank viewing). Above and in what follows, the iris will be used to represent any of the aforementioned biometric scans. The computer is directed to stop the test and indicate possible cheating and failure of the test on the display, and possibly convey this indication via a communications system incorporated into the computer to the test-providing institution or a test-monitoring facility. A reactive system is therefore provided in the computer coordinating the test to react to an indication of possible cheating.

When the test-taker has completed the test questions, he or she will indicate such through the computer keyboard and the light valve assembly 14 will no longer filter the test questions. The remainder of the interaction with the test-providing facility will then occur through the keyboard and/or mouse and the external computer.

The forward-looking camera 26 can have a field of view of 120°. This field of view (FOV) will cover the hands of the test-taker to check for the case where the test-taker is typing in the questions on a keyboard, other than the keyboard associated with the test, where they are transmitted to a consultant. If the hands of the test-taker cannot be seen by camera 26, the light valve assembly 14 will be turned off until the hands can be seen. If this happens frequently, then the test can be terminated. Camera 26 can also be used to check for the existence of other devices near the test-taker. These devices may include another computing device such as a tablet computer, a smart phone, smart watch, books or papers, displays other than the test answers on the external computer display, or any other information source which is not permitted for the test. If the test is an open book tests, then searching of some of the above-listed objects can be permitted. Software which accomplishes these pattern recognition tasks can utilize one or more trained neural networks or other AI software.

A limited number of encrypted commands which relate to the test being administered can be transmitted with the encrypted test from the test-providing institution. These commands control some aspects of the test taking process such as whether it is an open book or closed book examination, whether it is a timed test, how many restarts are permitted, how many pauses are permitted etc., since the test process is controlled by the device 10, these commands will be decrypted and used to guide the test taking process by the device 10.

Generally, there should be no talking while test taking is in progress. Microphones 28 and 29 are used to detect audio sounds and spoken words. If such sounds are detected particularly emanating from the test-taker, then the test can be paused or terminated depending on the test-providing institution's requirements. Information as to what the response required of device 10 for this or any other anomaly can be sent in encrypted form from the test-providing institution. To prevent spoofing of these commands, when the device 10 detects an anomaly, it can transmit a request for action to the test-providing institution via the host computer. The test-providing institution can respond with encrypted instructions as to what action to take.

The encrypted instruction can include a rolling code such that messages requiring the same result from the device 10 will not be identical and thus not able to be spoofed. To prevent the microphones 28, 29 from being covered with sound absorbing material, the speaker or sound generator 30 is provided to periodically create a sound which is then detected by the microphones 28, 29 and the quality of the detected signal can be ascertained. If the microphones 28, 29 cannot clearly hear the sound produced by the speaker 30, then the tests can be terminated until the issue is resolved. Speaker 30 may be placed at an alternate location on the housing 20 or frame 22 of to minimize direct sonic conduction through the structure.

FIG. 1B is a perspective view of the apparatus of FIG. 1A looking from the rear.

The processing unit includes a connection port to enable 24 a cable to extend from the processing unit in housing 20 to the computer being used for test-taking. This cable 24 may be the only connection between the processing unit in the housing 20 and the test-taking computer.

More importantly, for the reasons described above, to guarantee that the biometric measurements have not been compromised, at least one of the measurements should be accomplished on a secure device which is protected by a chassis intrusion detector (CID) device, as described below, and which contains the private key. Since the private key should be adjacent to the display view controller which is on the glasses, the biometrics measurement system also should be housed on the glasses. If a camera is mounted on the glasses so that it has a clear view of one of the test-taker's eyes, then an iris scan can be readily accomplished. Since the iris scan is among the most reliable of the biometric measurements, this may be sufficient. If a second biometric measurement is desired, then the same or different camera can perform a retinal scan or a scan of the blood vein pattern around the eye. This eliminates the need for this hardware to be part of the computer. Now, any computer can be used by the test-taker for test taking. The test image sequence is decrypted just as it enters the glasses and the display of the appropriate views can only be seen by the test-taker. The private key and test-taker's biometrics are stored in a CID-protected assembly on the glasses frame adjacent to the display. Microphones are provided to detect any talking by the test-taker and a sound creator to test the microphones.

Two problems remain which will be addressed below. A field of view limiter can be mounted on the display controller so that only the test-taker can observe the display. If the tablet display is not seen by a consultant, then this can be a secure system. Finally, a biometric scan camera 34 capable of detecting and analyzing an iris scan (and/or facial vein pattern or retinal) to provide a biometric analysis to confirm the identity of the test-taker is also included.

Eye tracking is available to control the test-taker's peripheral vision and gesture input can be an option for answering questions on the test being taken.

FIG. 2 illustrates a detailed illustration of the view control lens, light valve assembly 14, incorporating a field-of-view (FOV) control cover to limit the projection of the test to an area outside of the test-taker's eyes where a camera designed to capture the test may be located. FIG. 2 illustrates the device (glasses) 10 worn by the test-taker with the light valve assembly 14 containing the FOV limiter 36 allowing the test-taker only to see the test questions. FIG. 2A is a sectioned view of FIG. 2 taken along the line 2A-2A of FIG. 2 and FIG. 2B is an expanded view of the FOV limiter as seen in circle 2B in FIG. 2A. Generally, the light valve assembly 14 allows light transmission therethrough in a limited angular range to enable the person to see therethrough, e.g., view the test questions on a display in front of the device 10 (see FIGS. 3, 6 and 7), when the frame 22 is supported on the person's head and to prevent viewing therethrough (e.g., of the test questions on the display in front of the device 10) by a person other than the person on which the frame 22 is supported when the frame 22 is supported on the person's head. The limited angular range is coordinated to the location of the wearer's eyes when the frame 22 is supported on their head.

The FOV limiter is comprised of a series of concentric cylinders 52 which are spaced apart to block light passing through the light valve assembly 14 at angles greater than an angle which approximately covers the eye of the test-taker. The walls of the cylinders 52 block light from being seen at angles greater than, for example, +/−15 degrees which is just sufficient to cover the eyeball of the test-taker (the person on which the device 10 is secured). The limited angular range in this embodiment is therefore about 30 degrees centered about an axis passing through a central axis of the concentric cylinders 52.

The walls of the cylinders 52 can be about 0.5 mm thick and the spacing between the walls about 0.27 mm. These dimensions depend on the spacing of the FOV limiter 36 from the test-taker's eyes. Thus, a hidden camera which is not on or closely adjacent to the test-taker's eyeball will not be able to see the display through the light valve assembly 14. If such a camera were placed over the test-taker's eyeball, for example, it would be seen by the iris camera and the test can be terminated or other reactive step undertaken. The iris camera is designed to monitor the area where the FOV limiter 36 allows the display to be seen. As seen in FIG. 2B, the cylinders 52 are behind a transparent glass or plastic that is part of the viewing portion.

The operation of the light valve assembly 14 will now be explained with reference to FIG. 3 which illustrates the combination of the glasses (device 10) and a computer system which can be a laptop, desktop, tablet, smartphone or other computing device.

Without the light valve assembly 14, a determined cheater has a route open for getting the assistance of a consultant. Since the display of computer 120 can be observed optically, a consultant may position a camera with a telephoto lens somewhere in the room or on or through a wall that can view the display of the computer 120. Alternatively, the test-taker may wear a hidden camera, which is not observable by either the iris camera or a camera on the external computer, which can monitor the tablet display. Such a camera, for example, may be worn around the neck of the test-taker and view the screen through a very small opening in the shirt or blouse worn by the test-taker and be very difficult to see by a camera mounted on or near the computer display, for example. These two types of cameras, through-the-wall and test-taker-mounted, can be disguised in such a manner that it is virtually impossible for the system monitoring cameras, if present, to detect their presence. Nevertheless, either of these cameras can transmit the contents of the computer screen to a consultant in another room, for example. A solution to this problem rests in scrambling the display of the computer 120 and providing the test-taker with a special pair of glasses which descrambles the display using a light valve assembly such as 14. Many techniques are available for accomplishing this task and one will now be explained. Modern displays refresh the screen at 240 Hz. Since the text on a test changes very slowly only a small portion of this information needs to be seen by the test-taker. For example, if the screen displays constantly changing images which are very similar to the text on the test wherein only 5%, for example, of the images represent the actual test, then anyone observing the screen through one of the aforementioned cameras would see a blur of constantly changing text. If the test-taker wears a set of glasses, illustrated at 122 in FIG. 3, where the lenses are made opaque through liquid crystal or other light valve technology, then the lenses can be made transparent only during the 5% of the time that the display of the computer 120 presents the actual test questions. Such glasses are similar to commercially available consumer products which are used for 3-D television viewing. For an example of such glasses see http://www.dimensionaloptics-.com/Panasonic.aspx. The particular display frames that contain the actual test questions can be randomized and the random code indicating which frames are to be seen can be sent to the glasses control module in an encrypted form, also protected with a CID system, such that only the glasses 122 worn by the test-taker know which frames to pass through the light valve assembly 14 to be able to be viewed by the test-taker.

If the hidden camera image capture apparatus used by the consultant is sufficiently sophisticated, each frame could theoretically be captured and thus the consultant could see all of the frames and if it was obvious which frames contained the actual test questions, then the consultant could discard all the irrelevant images. It is therefore important that there be no obvious clue as to which images contain the actual test questions and remaining images must look very similar with only slight differences.

Figure 3:
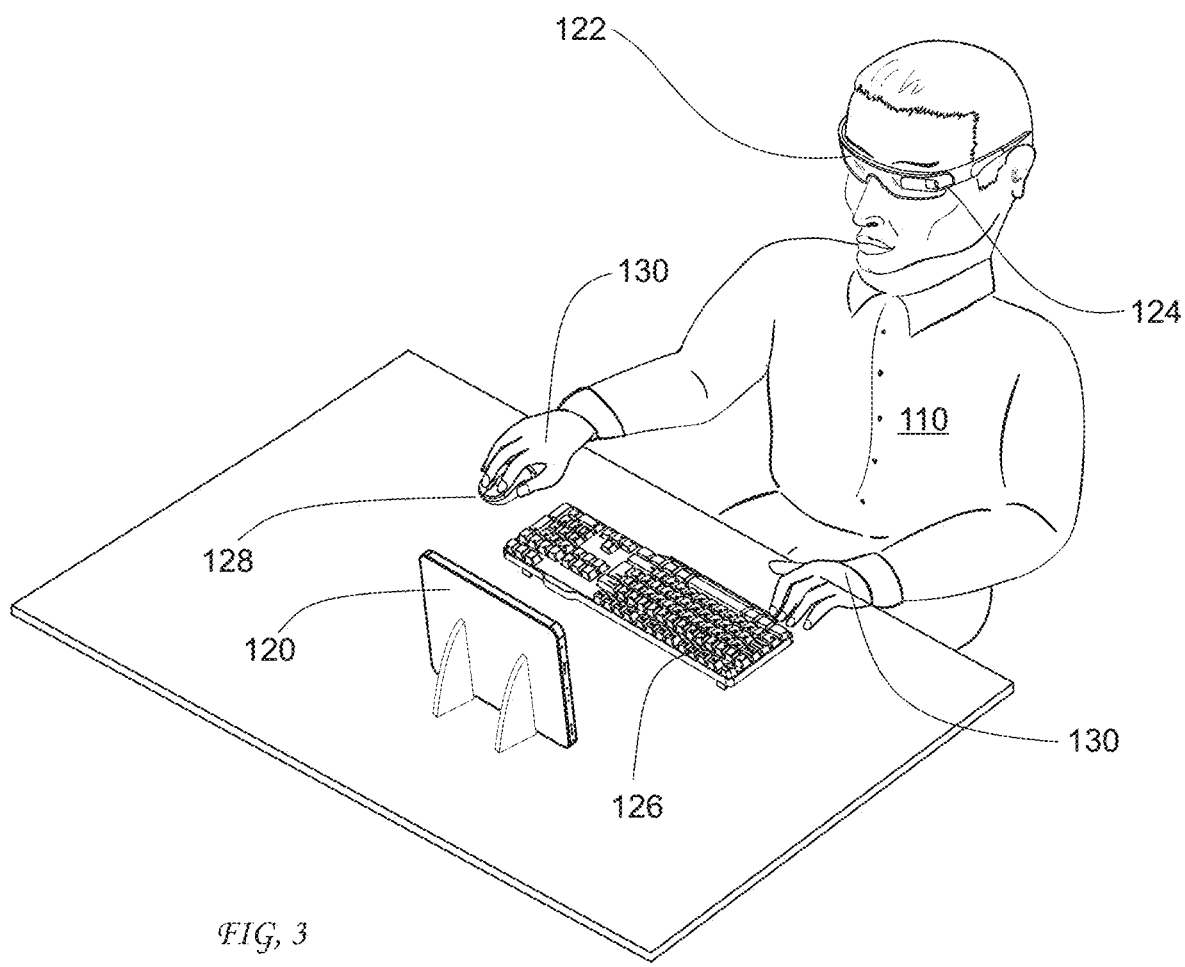
FIG. 3 illustrates the combination of the glasses and a computer system which can be a laptop, desktop, tablet, smartphone or other computing device.

FIG. 3 illustrates a view of a test-taker using the head worn apparatus 122, as represented by 10 in FIG. 1A, interacting with a computing device represented by the computer 120. Although the touchscreen display on the computer 120 could be used as a user interface, in this example a keyboard 126 and mouse 128 are provided as user interfaces to simplify the test taking process. The apparatus 122 includes a forward looking camera 124 which is different from cameras used in Google Glass™, for example, in that it provides a field of view that closely matches that of the test-taker.

In particular, hands 130 of the test-taker can be monitored by this camera 124 to ascertain that the test-taker 110 is not communicating with the consultant through typed messages using the keyboard 126 or any other device. Since the computer 120 used by the test-taker to provide answers to the questions has not in any way been secured, it could be used as a method for the test-taker to communicate with a consultant. Similarly, other devices such as a smart phone or additional tablet computer, may be hidden by the test-taker and used to send the questions to the consultant and receive communications back relating to the appropriate answers. Thus, the camera 124 and the associated pattern recognition software is an important aspect of this invention.

The pattern recognition software can be located within the electronics package associated with the apparatus 122, e.g., in a housing extending from or integral with the frame, and can be based on a trained neural network. One key advantage of this approach is that as experience is gained with the system, the neural network can be readily retrained to check for various newly discovered cheating methods. The fact that neural networks can be used in this fashion permits continuous improvement of the apparatus 122.

There are other sensors including the iris imaging camera and two or more microphones, that similarly provide data which contain patterns which are appropriate for neural network analysis (disclosed above in device 10 and which can be included in apparatus 122). In some cases, initially this analysis can be simplified by using the differences between two images. For example, for the iris monitoring camera 34, it is expected that the image of this should be invariant and therefore any significant changes in that image would be indicative of an anomaly which should be brought to the attention of the test-taker for remedial action. Similarly, once the test has begun, there should be no voices sensed by the microphone 28, 29 and therefore if any voice frequencies are present, especially emanating from the mouth of the test-taker, the anomaly can be highlighted for remedial action by the test-taker. The iris image analysis can be somewhat more complicated, however, again since it is the difference between two such images which is significant, the analysis can at least initially be relatively uncomplicated. The difference between two images of the same test-taker should be relatively minor whereas the difference between another person's iris image and that of the test-taker can be quite complicated. This should be easily detectable. In order to guard against the use of a contact lens with a painted surface showing an invariant iris image to a iris imaging camera, LEDs 38 as illustrated in FIG. 1B are provided to cause the iris to change its opening aperture due to more intense illumination thereby giving two different images of the iris for verification. Again however, the analysis can be relatively simple where in the first instance, the iris which is imaged under the two different conditions is recorded and thereafter, only image subtraction and relatively minor analysis is required.

An objective of this test taking system is that it is completely automatic without requiring the intervention of any human other than the test-taker 110. The institution administering the test will have a limited set of rules which, if violated, will render the test invalid. These rules can be general rules or rules specific to the particular test being taken. These rules can include: the events which will invalidate a test; the number of times that the test, once an event has occurred, can be restarted if any; the number of times that a particular test can be taken if failed; the time permitted to take the test; the number and length of pauses permitted during the test taking process, etc. The rules may or may not be made available to the test-taker 110.

All of this puts a small burden on the institution to draw arbitrary lines as to what constitutes cheating and what does not. This is a relatively light burden with the test taking apparatus, since once the rules have been set the opportunities for an undetected violation of these rules are very limited or virtually nonexistent.

A substantial number of sensors have been introduced, each of these sensors requires an algorithm to assess the sensor output and determine whether the test-taker is cheating or not. Since the apparatus 10, 122 are provided with a chassis intrusion detector (CID), such as disclosed herein, it is virtually impossible for a consultant to modify the apparatus 10, 122 to transmit the display information to another room, for example. With a CID, there are no accessible wires which connect the display to the electronics package, for example. Finally, the display control light valve itself is protected. The test-taker 110 can wear a camera which has a lens the size of a small pea but in order for that camera to see the display, it will also itself be seen by the iris imager camera 34.

Of course, if a cheating method is discovered, it will quickly become public through the Internet. Therefore, a continuous improvement process which rewards test-takers who discover cheating methods should be implemented.

At the discretion of the institution, a time limit or no time limit can be afforded the test-taker 110 for completing the test. Similarly, a course can have only a single final exam or a series of quizzes in addition to a final exam or feedback can be requested from the test-taker 110 during each course session depending on the course and the desires of the institution. Since all such tests will be graded automatically, the cost of having daily or more frequent quizzes versus a single final exam is insignificant. In one extreme case, all the required courses can be given without any exams and a final comprehensive exam can be used to validate a student for receiving a degree. Alternately, the student can be tested continuously during the course or degree process without any final examinations. These decisions are left up to the institution. These options are facilitated due to the ability of the student to observe instruction presented on the computer screen, and through textbook assignments, and at arbitrary times be tested using the apparatus 10, 122.

The test-taker can enter data into the testing program through the keyboard 126, a track pad (not shown), and/or the mouse 128, or any other type of user interface such as a touch screen of the computer 120. The mouse 128 can be attached to the computer 120 with a fixed wire or be wirelessly connected to the computer 120.

Various biometric technologies for verifying the identity of the test-taker for use with apparatus 10, 122 will now be discussed. Since the apparatus 10, 122 are mounted on the head in front of the eyes, the most readily available biometrics are images of the eyes or facial tissues surrounding the eyes. A variety of different biometric tests can be devised, but the most common are retinal scans and iris scans. Both are available using a camera mounted in conjunction with the apparatus 10, 122. The retinal scan is used to examine the pattern of blood vessels at the back of the eye. Although retinal patterns may be altered in cases of diabetes, glaucoma or retinal degenerative disorders, the retina typically remains unchanged from birth until death. Due to its unique and unchanging nature, the retina appears to be the most precise and reliable biometric, aside from DNA. Advocates of retinal scanning have concluded that it is so accurate that its error rate is estimated to be only one in a million with appropriate software. The blood vessels within the retina absorb light more readily than the surrounding tissue and are easily identified with appropriate lighting. A retinal scan is performed by casting an unperceived beam of low-energy infrared light into a person's eye as they look through the scanner's lens. This beam of light traces a standardized path on the retina. Because retinal blood vessels are more absorbent of this light than the rest of the eye, the amount of reflection varies during the scan. The pattern of variations is converted to computer code and stored in a database.

The iris scan is an automated method of biometric identification that uses mathematical pattern-recognition techniques on video images of the irises of an individual's eyes, whose complex random patterns are unique and can be seen from some distance. Not to be confused with other, less prevalent, ocular-based technologies, retina scanning and eye printing, iris recognition uses camera technology with subtle infrared illumination to acquire images of the detail-rich, intricate structures of the iris externally visible at the front of the eye. Digital templates encoded from these patterns by mathematical and statistical algorithms allow the identification of an individual. Many millions of persons in several countries around the world have been enrolled in iris recognition systems, for convenience purposes such as passport-free automated border-crossings, and some national ID systems based on this technology are being deployed. A key advantage of iris recognition, besides its speed of matching and its extreme resistance to false matches, is the stability of the iris as an internal, protected, yet externally visible organ of the eye.

Both of these scans are extremely accurate and very difficult to fake. Since the apparatus for conducting these scans is protected by the chassis intrusion detector system, they are a preferred biometric identification systems for use with this invention. Although it has been proposed that secure testing systems utilize more than one biometric identification, the accuracy of either of the retinal or iris scans is so high as to eliminate the need for a second biometric identification system. The iris scan is somewhat easier to implement and therefore is the preferred system for use with this invention. Nevertheless, to satisfy the desire for dual biometrics, a heartbeat monitor 42 has been optionally provided as described above (see FIG. 1A).

Consideration is necessary concerning where the test-taker's biometrics are stored. If they are transmitted to the test-providing institution, then there is the risk that if they are not encrypted that the transmission can be captured, allowing a consultant to log on as the test-taker in the future.

If they are encrypted at the laptop, then even the encrypted biometrics can be captured and used by the consultant. A solution is for the institution to transmit an encrypted random number to the laptop which combines that number with a code representing the success or failure of a biometrics measurement and transmits a combination of the decrypted random number and the code back to the institution. For example, assume that the random number was 45896 and 1 represents a biometrics failure and 0 a success. The laptop upon failure of the biometrics test would return 45897 to the institution and the institution would then not proceed with the test. Thus, if the private key is secure on the laptop, then only the laptop needs to know the test-taker's biometrics which will be stored only locally and can be stored in a coded manner which makes spoofing by another system difficult or impossible. The preferred system and method, however, is to store the private key and biometrics in the CID protected glasses.

Figure 4:
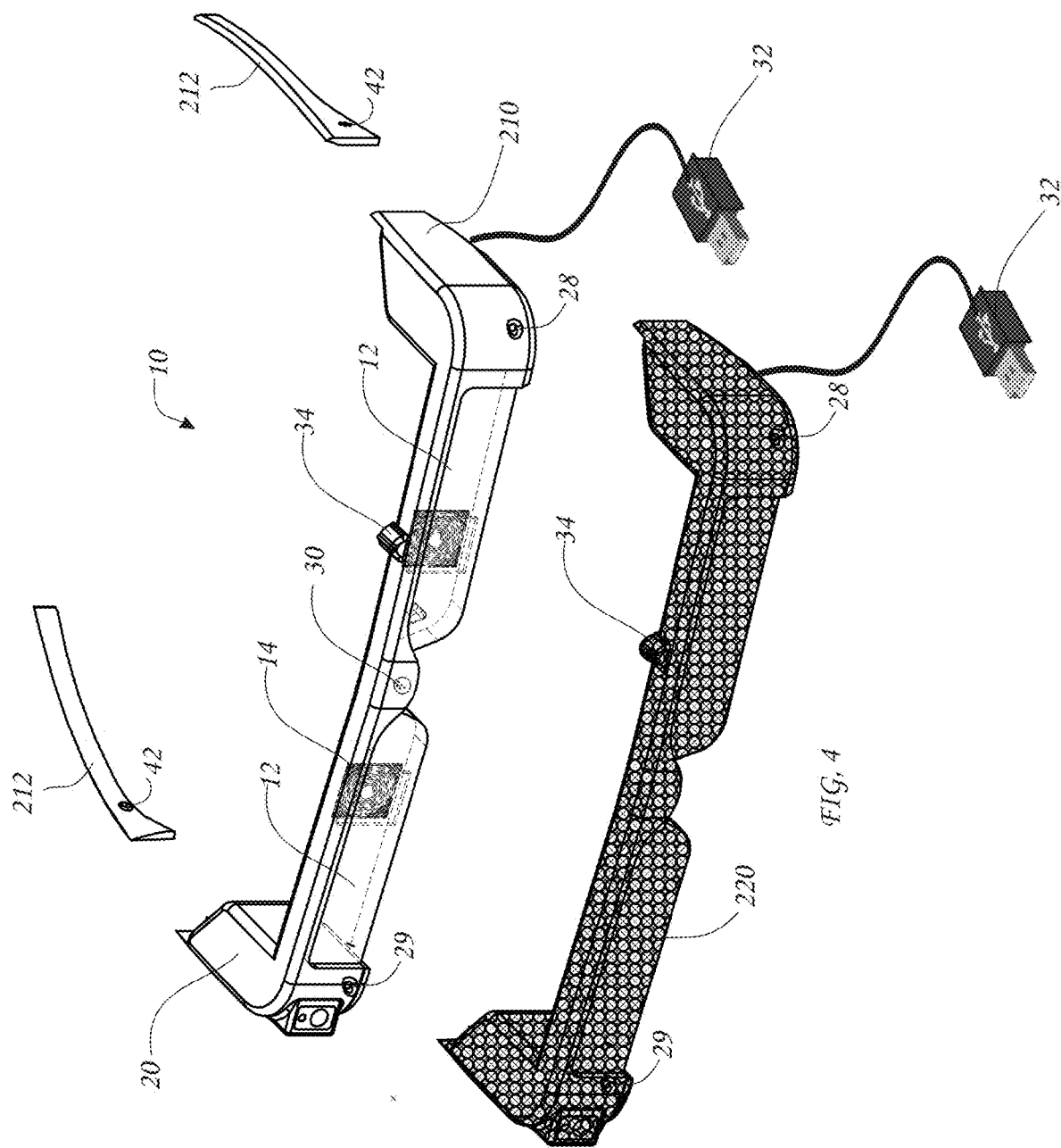
FIG. 4 is a view of the chassis intrusion detector CID apparatus covering the apparatus of FIG. 1A.

One preferred method in implementing a chassis intrusion protection (CID) system in conjunction with the test-taking apparatus 10 is illustrated in FIG. 4 at 220. In this implementation, the glasses assembly is separated into three parts, the main assembly 210 to be protected and two temples 212. The two temples 212 can contain the optional heartbeat monitor illustrated at 42 on one or both temples 212. If the heartbeat monitor 42 is used, then there will need to be an electrical connection, not shown, to the main assembly 210. Any such connections, including the connection to the computer though the wire and USB connector 32, will need to pass through the CID. The CID can be in the form of a thin film which is wrapped around the housing 20 and then heated so that the film flows together and seals the housing 20 leaving no openings. If further protection is desired, the entire assembly can be coated in another thin film which then binds the CID together with the housing 20. Many other techniques will now suggest themselves to those skilled in the art.

Figure 5:
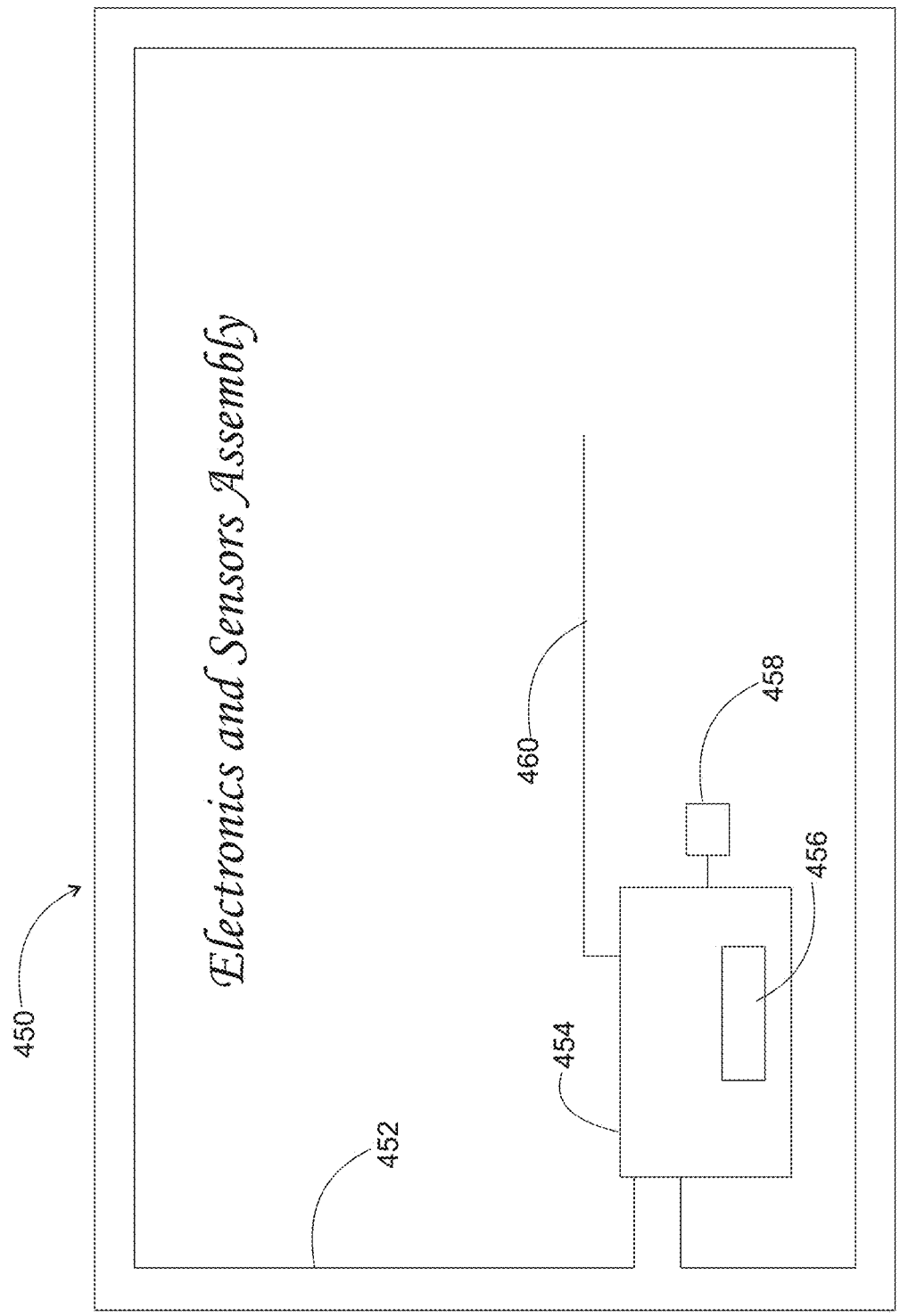
FIG. 5 is a schematic of the operation of the chassis intrusion detector in accordance with the invention.

The CID 220 in this implementation comprises a very thin film containing one or more very thin closely spaced wires. These wires form a circuit which is monitored as illustrated in FIG. 5. The film and wires are sufficiently small that both light and sound can pass through without significant attenuation. However, if any of the wires are severed, as would happen if any physical intrusion were attempted, such a severing is detected by the detection circuit of FIG. 5 and the stored biometrics and private decryption key can be erased rendering the glasses incapable of test taking.

A schematic of the operation of the chassis intrusion detector of FIG. 4 is provided in FIG. 5 for the labyrinth circuit case. Since the chassis intrusion detector is designed to encompass the entire electronics and sensors assembly, it must be relatively thin so as not to interfere with the microphones 28, 29 and speaker 30 and be transparent such as to not interfere with the display or cameras. One method is to form a film comprising several layers. The first layer adjacent to the apparatus would be a thin plastic film. Onto that layer is deposited a thin layer of a conductive material which can be indium tin oxide or graphene. The former is relatively available whereas the graphene is becoming more and more available. After the conductive layer is deposited onto the first plastic layer, a second thin plastic layer is deposited over the conductive layer and a second conductive layer is deposited onto the second plastic layer. Finally, the assembly is completed with the depositing of a third plastic layer. Each of these layers is typically between about 0.001 and about 0.010 inches thick and the total assembly is transparent.

The chassis intrusion detector can contain its own microprocessor security assembly 454 and battery 458. It also contains its own RAM memory 456. The RAM memory 456 contains the private key which is kept alive by the battery 458. The battery 458 is chosen such that it can provide sufficient power to maintain the RAM memory 456 active for several years and provide power to the microprocessor to monitor the conductive films. The conductive films are attached to the microprocessor which checks for the capacitance between the two films. Any change in this capacitance detected by the microprocessor is indicative of an attempt to intrude into the interior of the electronics and sensors assembly. If such intrusion is detected, then power is removed from the RAM memory 456 and the private key pair erased.

Since a carefully placed hole or multiple holes through the plastic film assembly can cause only a minor change in the capacitance as long as the conductive layers are not shorted together, a preferred alternative construction, as illustrated in FIG. 4, is to replace the two conductive layers and separating plastic film with a single layer comprising a labyrinth of wires which are very narrow and closely spaced such that any attempt to penetrate the film will cause one or more of these wires to be cut. The microprocessor therefore monitors the total resistance, inductance or mutual inductance of this circuit and erases the private key and other memory contents if there is a significant change in these measurements. Since any attempt to break into the electronic and sensor assembly will necessarily sever one of these wires, this design provides an easily detectable method of determining an attempt to intrude into the system electronics and sensor assembly.

A schematic of the chassis intrusion detector system is shown in FIG. 5 generally at 450. Power is supplied from the external computer at 460 through the wire and USB connector 32 of FIG. 4. Wire 460 also provides communication from the electronics and sensors assembly of which the security assembly SA is a part. The fine wire maze is shown schematically at 452, the security assembly (SA) at 454, the long-life battery at 458 and the RAM memory at 456. The security assembly (SA) 454 can be a separate subassembly which is further protected by being potted with a material such that any attempt to obtain access to the wires connecting the battery to the microprocessor therein or to the RAM memory 456 would be broken during such an attempt. This is a secondary precaution since penetration to the SA 454 should not be possible without destroying the private key.

To summarize, any disruption of the wire mesh or conductive film in either of the above described examples will destroy the private key, and other memory contents, making it impossible to decode the test question sequence. After the assembly is completed, the computer can be powered on and the first step would be to measure the inductance, resistance, and capacitance, as appropriate, of the mesh or films. Thereafter, if any of these measurements significantly change, then the circuit in the SA 454 would remove power from the RAM memory 456 thereby destroying the private key and other memory contents. Since the private key cannot be reloaded, the assembly would need to be returned to the factory for remanufacture and the insertion of a new SA 454 or entire electronics and sensors assembly.

Figure 6:
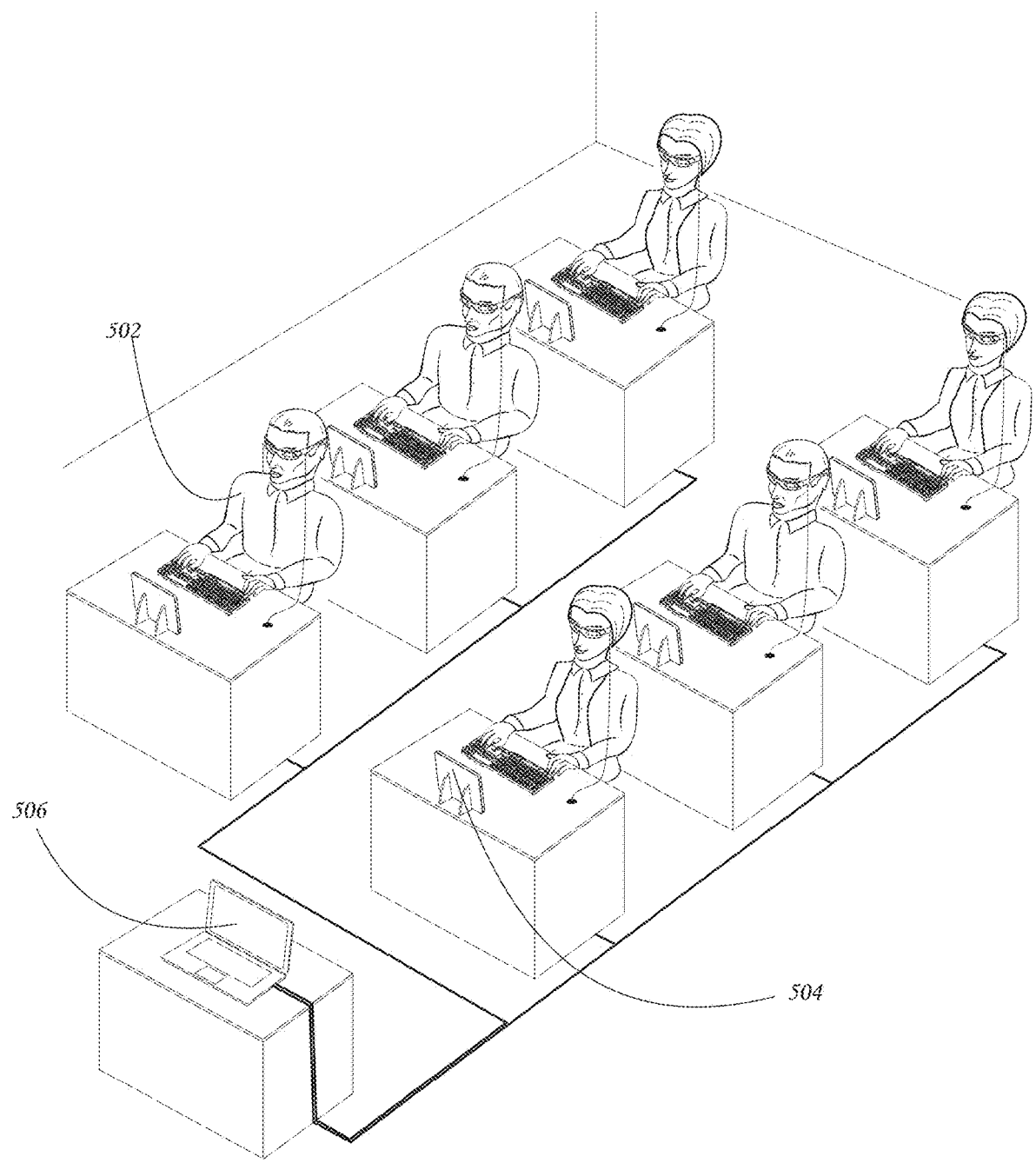
FIG. 6 illustrates the use of the apparatus in accordance with the invention by a room full of test-takers where each device is attached to a central computer through a USB port.

The apparatus 10, 122 can be used by test-takers remotely located from the institution providing the test. Alternatively, as illustrated in FIG. 6, the apparatus 10, 122 can be used by a room full of test-takers where each device is attached to a central computer through, for example, a USB port. In this case, each student 502 is provided with a keyboard and/or a mouse or other input device, and a display 504. Each of the devices is connected to a central computer 506. Otherwise, the operation of the apparatus 10, 122 is as described above.

Figure 7:
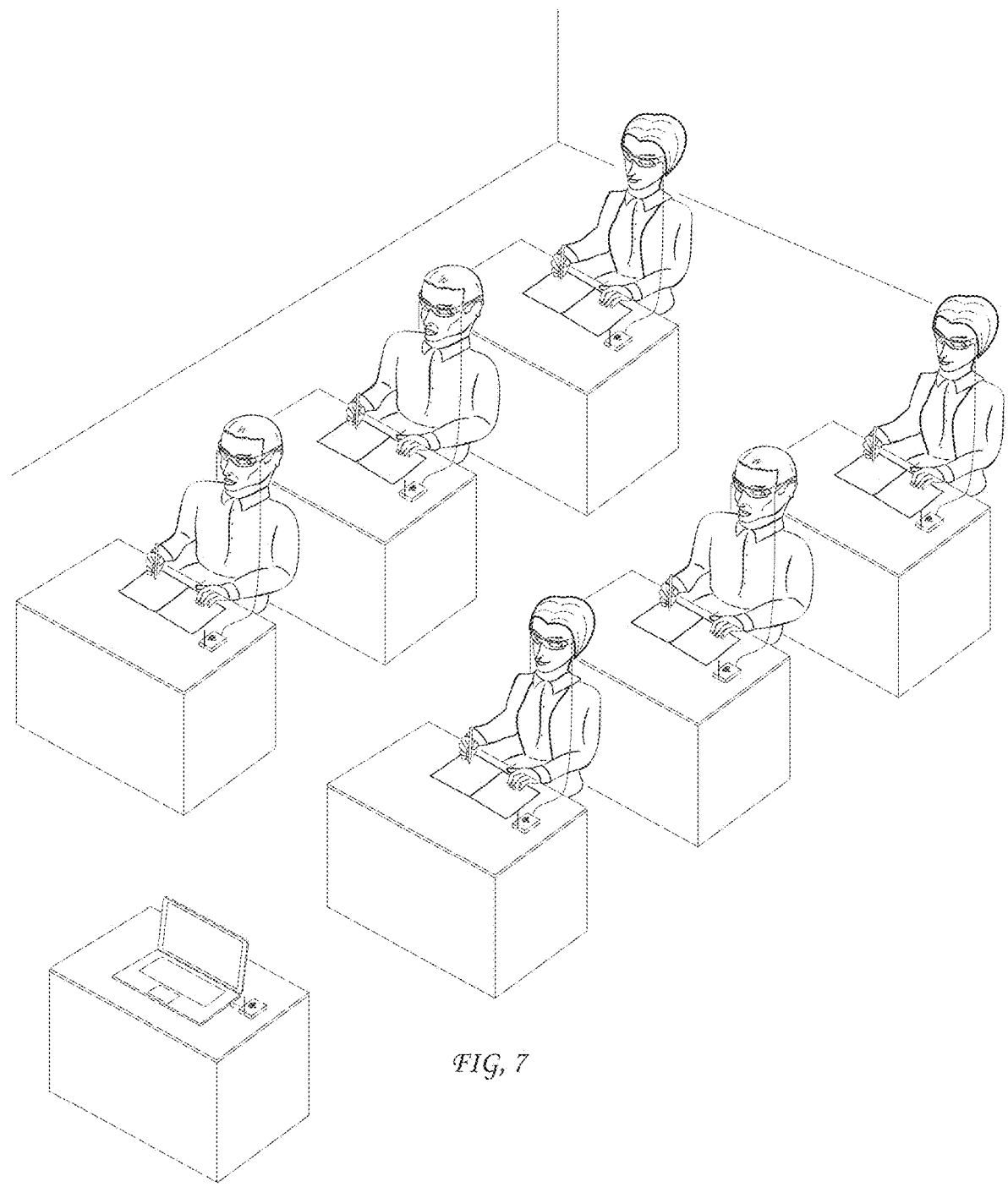
FIG. 7 is a view like FIG. 6 with a wireless connection through a wireless transmitter box associated with each desk and where the test-takers are using paper to record their test answers.

FIG. 7 is a view similar to FIG. 6 where the answers are placed on a piece of paper which will be collected by the test proctor at the conclusion of the test. Again, since each test-taker will be taking the same test with the questions randomly ordered or sequences, there is no advantage in a test-taker surreptitiously communicating an answer to another test-taker. Thus, by the arrangements depicted in FIGS. 6 and 7, the apparatus 10, 122 can be used either remotely or in a classroom environment.

Figure 8:
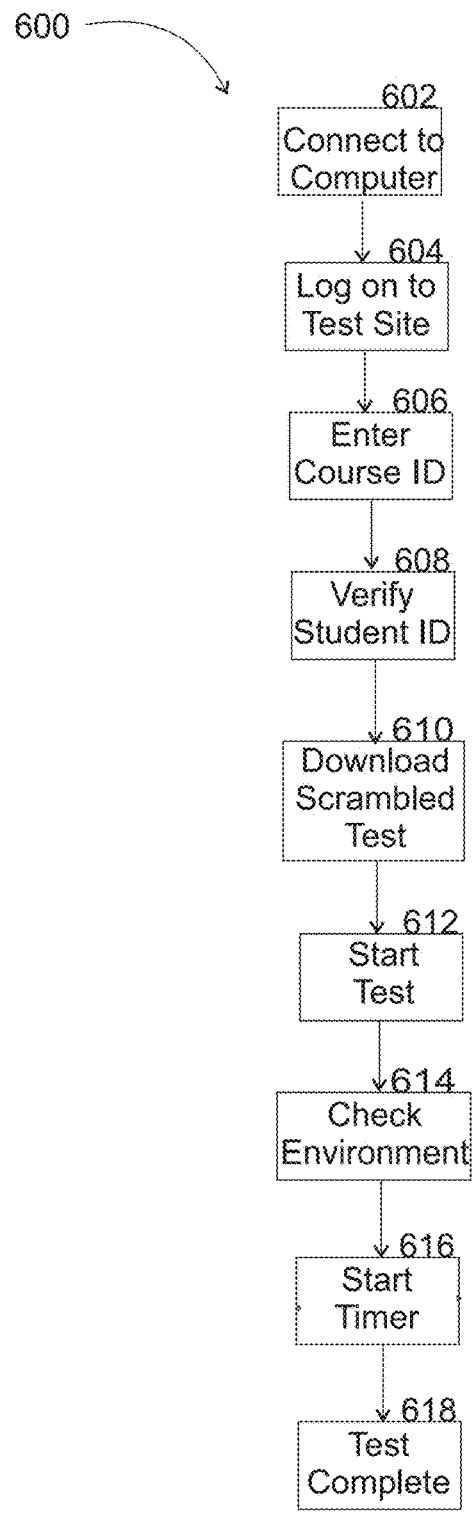
FIG. 8 is a flowchart illustrating a startup, running, and shut down of the test taking process in accordance with the invention.

An exemplifying, non-limiting system process flowchart is illustrated generally at 600 in FIG. 8.

1. The test-taker plugs the USB connector from the apparatus 10, 122 into the intermediary computer at step 602, puts on the apparatus 10, 122 which recognizes that the test-taker's eye is in view of the iris imaging camera.
2. The test-taker logs on to the Internet, or other computer system, and communicates with the test-providing institution at step 604. If this communication attempt is successful, then the test-taker will be prompted to identify himself/herself which may include his student identification code or number and indicates that he/she is ready to take a test.
3. The test-taker is prompted to enter the identification of the course for which he or she desires to take the test at step 606. Software at the institution then determines the appropriate test to be provided to the test-taker, for example, based on his or her progress to date. The test-taker's biometrics can now be verified at step 608.
4. The test-providing institution modifies the standard test to be given to the test-takers by rearranging the questions in a random order and associates that order with the test-taker's ID.
5. Once the appropriate test has been determined, it is downloaded to the intermediary computer along with the encrypted sequence code of display content relating to the test. The encrypted sequence code is then forwarded to the apparatus 10, 122 for decryption and control of the light valve assembly at step 610. The initial page of the test is then displayed on the computer display and the test-taker indicates his or her readiness to start the test at step 612.
6. The apparatus 10, 122 continue to perform iris scans or other biometric identification scans throughout the test to verify that the apparatus 10, 122 have not been removed (i.e., there is no change in biometric data) and that the proper student is taking the test. Initially, a message can be sent to the test-providing institution via the intermediary computer indicating that the device has successfully verified the test-taker's biometrics if desired by the institution.
7. The apparatus 10, 122 performs an analysis from the forward facing imager 26 to verify that the test requirements for the environment are met and a pair of microphones 28, 29 functioning test is performed by the speaker 30 admitting a sound to the microphones which is analyzed to ascertain that it has been properly received at step 614.
8. A display appears on the intermediary computer listing the question numbers and providing a space for the answers.
9. If appropriate, the test timer is started at step 616 and the test-taker proceeds to read the questions and answer them using the keyboard and/or the mouse attached to the intermediary computer.
10. The forward-looking camera 26 constantly monitors the field of view of the test-taker to check for any violation of the test rules.
11. The microphone also constantly monitors the sound near the test-taker, and particularly from the test-taker's mouth, to check for any verbal violation of the test rules.
12. The iris imaging camera constantly verifies that the iris exists at its expected location indicating that the test-taker continues to wear the apparatus 10, 122 (i.e., there is no change in biometric data, and remains in the current state).
13. If the iris is not found or there are any other violations of the test rules discovered, then the light valve terminates filtering the display output (and provides its light-blocked or blanked state, i.e., changes state).
14. Depending on the rules which were violated causing the functioning of the light valve to terminate, remedial action is undertaken as dictated by the test-providing institution.
15. Using the keyboard or mouse associated with the intermediary computer, the test-taker indicates that he has completed taking the test at step 618.
16. Upon completion, the test answers are forwarded to the institution by the intermediary computer.

Special software is required for the external computer. This software may vary depending on the operating system of that computer but generally will be provided by the test-providing institution. This software will manage the interface between the apparatus 10, 122 and the test-providing institution. The software also will not permit any information to be displayed on the screen while the test is underway other than information related to the test. The forward monitoring camera 26 will confirm that there is no unexpected information displayed on the computer screen and if so a fault will be indicated and the test terminated.

Figure 9:
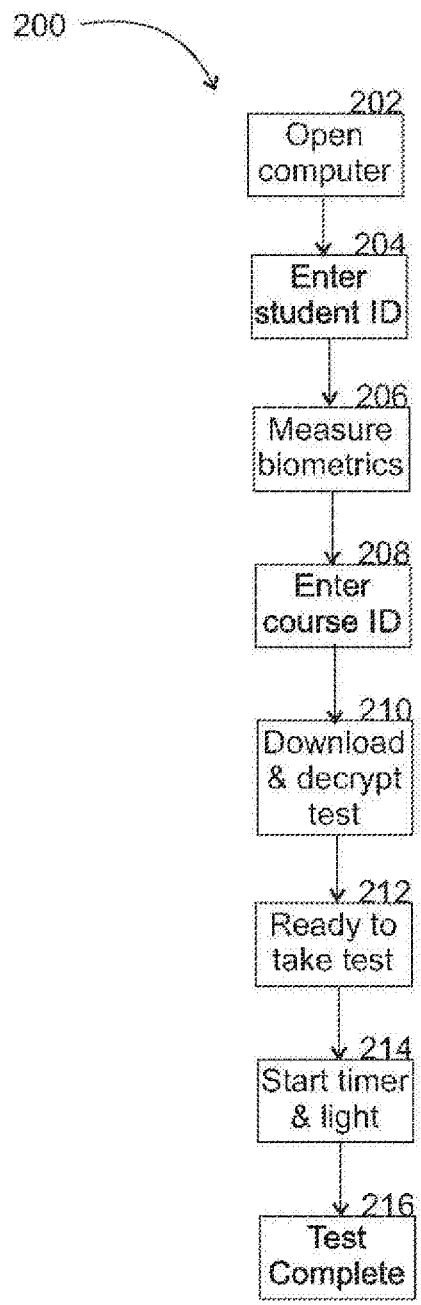
FIG. 9 is a flowchart illustrating a startup, running, and shut down of the test taking process.

An exemplifying, non-limiting system process flowchart is illustrated generally at 200 in FIG. 9. At step 202, to begin a test using the testing assembly or computer 120, the computer 120 attempts to log on to the Internet and communicate with the test-providing institution. If this communication attempt is successful, then the student will be prompted to identify himself which may include his student identification code or number at step 204. At step 206, the biometrics of the student is/are measured and checked to validate that this is the student whose record has been accessed at the institution. Such biometric identification codes may have been previously stored at the institution associated with the students ID as discussed herein. If the student is confirmed based on the measured biometrics, the student is prompted to enter the identification of the course for which he or she desires to take the test at step 208. Software at the institution then determines the appropriate test to be provided to the student, for example, based on his or her progress to date. Once the appropriate test has been determined, it is downloaded and decrypted by the computer 120 at step 210. The initial page of the test is then displayed on the display of the computer 120 and the student indicates his or her readiness to start the test at step 212.

The test timer is then started and a test in-progress light is illuminated at step 214. At step 216, the student takes the examination. When the student has completed the test, he or she indicates this by an appropriate computer keyboard entry and the test is completed. At this point, the answers can be encrypted, although they do not need to be since the answers do not display the questions, and transferred to the institution over the Internet and the test in-progress light is turned off.

Figure 10:
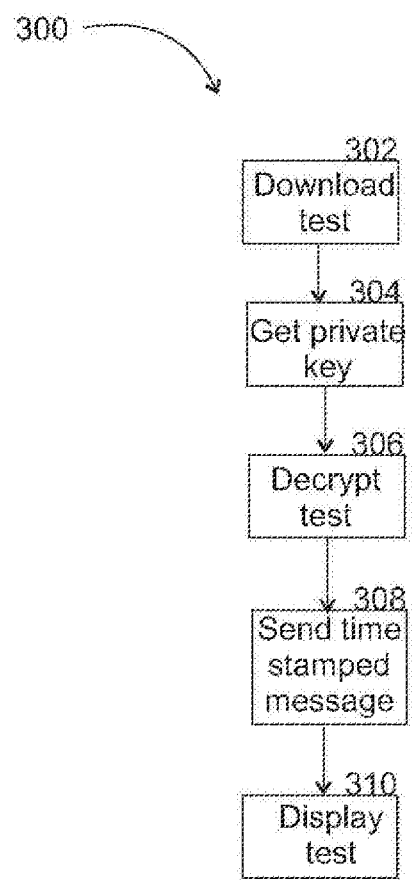
FIG. 10 illustrates a flowchart for the encryption scheme utilized to prevent access to the test by other computers or devices then the designated computer.

FIG. 10 provides a flowchart for an encryption/decryption scheme shown generally at 300 (corresponding to step 210 in FIG. 9). At step 302, the test is downloaded by the testing assembly and at step 304, the private key is retrieved, typically from a memory in the computer 120 as discussed herein. At step 306, decryption using the stored private key is accomplished and at step 308, a time stamped message is sent to the testing institution indicating that this decryption was successful. At step 310, the test is displayed on the student's computer waiting for an indication from the student that he or she is ready to proceed.

To use the computer 120 in this manner, the chassis should be protected with a chassis intrusion detector with the private key stored in RAM volatile memory with its own long life battery power supply as described herein. If this is not the case, then the computer can be opened and the display images transmitted off the computer, and if the private key is stored in nonvolatile memory, it can be retrieved and used by another computer which is designed to spoof the computer. With the cost of education approaching or exceeding $100,000, there is ample motivation to undertake these actions.

Figure 11:
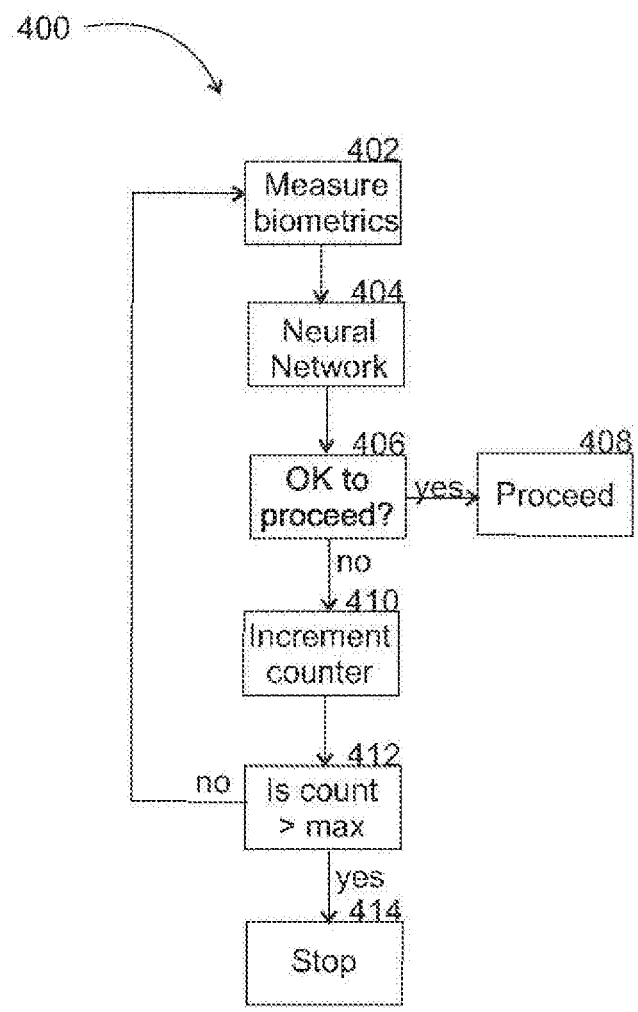
FIG. 11 is a pattern recognition flowchart using neural networks for identifying the test taker.

FIG. 11 illustrates a pattern recognition flowchart shown generally at 400.

A properly trained general pattern recognition process can be used for any of the biometric data retrieved by the sensors of the testing assembly as listed above including facial recognition, voiceprint, palm print, fingerprint, iris scan patterns, signature recognition, or any of the other pattern-based biometric identification systems described herein. The biometric data is acquired at step 402 and input into the pattern recognition algorithm which can be a properly trained neural network at 404. If verified, this information is sent to the institution, as described above, which returns a code indicating that it is okay to proceed with the test taking process at step 406. Specifically, the institution compares the transmission received with the sent random number and indicates whether the test taking is allowed to proceed, so that the test taking procedure proceeds at step 408. Alternately, the appropriate neural network check of the biometric test data can be accomplished at the institution, in which case, the data is transferred to the institution. However, this adds significant risk to the process as described above, so it is not recommended. If agreement between the stored biometric data and the newly acquired biometric data does not agree, then the trial count is incremented by one at 410. If the trial count has not exceeded the maximum permitted as determined at step 412, then the student is requested to initiate a re-acquisition of the biometric data and the process repeated. If the maximum number of tries is exceeded, then the test is not downloaded and the student is logged off of the session at step 414.

Some important features of disclosed inventions differentiate them significantly from other attempts to develop secure testing systems. These include:

1. Use of a head-mounted display light valve-based controller for presenting randomized questions to the test-taker in a manner that such questions cannot be obtained or observed by another person. Such a controller can comprise a LCD, OLED, Pockels cell, Kerr cell or other light valve which blanks out the lens at times except when the proper test or test questions is displayed on the computer display.
2. A field-of-view device can be provided to control the angle which allows the test-taker to see the test so that only the test-taker's eye can see the test.
3. The same test is given to multiple test-takers wherein the order of the tests questions is randomized to prevent the passing of answers from one test-taker to another. Each test-taker will take the identical test but the questions are ordered differently.
4. The test taking process is fully automatic and does not require any human intervention. If the test-taker violates rules of the test-providing institution, the particular violation will be noted and provided to the test-taker and/or the institution. The institution may only get involved if the test-taker protests the results.
5. No data is transmitted in an encrypted form from the apparatus 10, 122 to the test-providing institution. The test-providing institution knows the test that was provided to the test-taker based on his/her ID and therefore can match the test answers with the questions.
6. No video or audio data is forwarded to the test-taking institution. If the test was successfully complete, it is assumed that no cheating occurred. If the test is interrupted, then diagnostic information can be retained and upon request of the institution forwarded thereto for diagnostic purposes. In general, neither video nor audio information is stored during the test-taking process unless the test is interrupted.
7. No behavioral measurements are made, recorded, or sent to the institution and thus it is not necessary to try to interpret cheating activity based on biometric or other measurements.
8. The test questions are only available to the display controller which is part of the apparatus 10, 122 and protected using strong encryption and by the chassis intrusion detecting system.
9. Since it is virtually impossible for a consultant to observe a copy of the test, attempts to determine that a consultant is communicating with the test-taker other than oral communications are unnecessary. Such communications from the consultant are impossible to reliably detect.
10. The decryption private key is created as part of a key pair by the test-providing institution and after loading into the test glasses, the private key can be destroyed. Since then the only copy that exists is on the test glasses and protected by the chassis intrusion detector, no other device can decrypt the test display sequence which has been created by the test-providing institution uniquely for the particular apparatus 10, 122.
11. The use of a chassis intrusion detection (CID) sensor or system which renders the physical breach of the apparatus virtually impossible without destroying the private key needed for test view sequence decryption.
12. The detection of sound emitted by the test-taker such that anything sound emitted by the mouth of the test-taker can be detected and the source located by the microphones.
13. The detection, for example, of a smart watch or other similar apparatus used for cheating which can be hidden from view of a tablet or other non-glasses mounted camera but can be detected by the head mounted forward facing camera.
14. Use of sophisticated neural network based pattern recognition algorithms which allow for continuous improvement of this system as new cheating methods are discovered. This allows for upgrading the software of the system as new improvements are implemented.

The capability exists for adding the detection of suspicious behaviors on the part of the test taker.

15. Use of a scrambled display and light valve glasses to permit the contents of the display to be only observed by the test-taker and not capable of being captured in a meaningful way by a camera having a view of the display.

Disclosed herein are a series of measures that are designed to prevent the transfer of test related information to anyone other than the test-taker by any means either visually, electronically, or wirelessly. The measures disclosed herein are not exhaustive and the intent of this invention is to cover preferred implementations of such techniques.

Finally, all patents, patent application publications and non-patent material identified above are incorporated by reference herein. The features disclosed in this material may be used in the invention to the extent possible.

The invention claimed is:

1. A method for administering tests to test-takers, comprising:
    directing a respective one of the tests from a source of tests to each of a plurality of testing assemblies being used by a respective one of the test-takers, each of the tests comprising real displays;
    displaying, on a display of each of the testing assemblies visible to the respective one of the test-takers, a sequence of the real displays for the respective one of the tests and fake displays;
    directing, to each of the testing assemblies, an encrypted code providing, when decrypted, places of the real displays in the sequence of the real displays for the respective one of the tests and fake displays;
    decrypting, at each of the testing assemblies, the encrypted code to obtain the places of the real displays in the sequence of the real displays for the respective one of the tests and fake displays;
    controlling a light valve assembly in each of the testing assemblies interposed between the display and eyes of the test-takers based on the obtained places of the real displays in the sequence of the real displays for the respective one of the tests and fake displays to cause the light valve assembly to assume, when a real display is being displayed, a first state in which the test-taker is able to view the display through the light valve assembly and thus the real display and assume, when a fake display is being displayed, a second state in which the test-taker is prevented from viewing the display through the light valve assembly; and
    receiving responses from the test-takers to queries in the displayed real displays via at least one respective user interface associated with each of the testing assemblies;
    whereby by evaluating the received responses from each of the test-takers, associating the evaluations with the determined identity of the test-takers, and grading the tests, a record of the test-takers with their grades is created.

2. The method of claim 1, wherein the real displays comprise multiple-choice test questions, further comprising:
    generating the tests from a plurality of common multiple-choice test questions; and
    changing the order of the multiple-choice test questions in each test to create a plurality of different tests.

3. The method of claim 1, further comprising encapsulating a housing that houses structure that decrypts the encrypted code in a chassis intrusion detector of each of the testing assemblies that detects intrusion into the housing.

4. The method of claim 1, further comprising:
    performing a biometric evaluation to determine an identity of each of the test-takers using a biometric identification device of the respective one of the plurality of testing assemblies;
    obtaining biometric data of each of the test-takers of the same type that is obtained by the biometric identification device of the testing assemblies prior to administration of an initial test;
    recording the obtained biometric data in a memory component for each of the test-takers; and then
    generating a signal indicating that the test-taker is ready to take the initial test.

5. The method of claim 4, wherein the step of performing the biometric evaluation to determine identity of each of the test-takers using the biometric identification device comprises:
    obtaining biometric data of each of the test-takers using the biometric identification device at the location of each of the test-takers prior to administration of a subsequent test after the initial test;
    ascertaining, based on the obtained biometric data, whether the test-taker using each of the testing assemblies when taking the initial test is the same as the test-taker using the same testing assembly when taking the subsequent test; and
    when it is ascertained that the test-taker using each of the testing assemblies when taking the initial test is the same as the test-taker using the same testing assembly when taking the subsequent test, generating a signal indicating that the test-taker is ready to take the subsequent test to enable reception of the subsequent test by the testing assembly.

6. The method of claim 1, wherein each of the plurality of testing assemblies is positioned on a head of the respective one of the test-takers at a location of the respective one of the test-takers, the method further comprising:
    performing a biometric evaluation to determine an identity of each of the test-takers using a biometric identification device of a respective one of the plurality of testing assemblies;
    wherein the step of performing the biometric evaluation to determine identity of each of the test-takers using the biometric identification device comprises obtaining an image of each of the test-takers' iris using an iris scan camera of each of the testing assemblies and performing a biometric check on the identity of the test-taker based on the obtained image of the iris.

7. The method of claim 1, further comprising generating the sequence of the real displays for the respective one of the tests and fake displays so that the real displays appear at a set place within each of a plurality of consecutive groups of a common number of displays.

8. The method of claim 1, wherein each of the plurality of testing assemblies is positioned on a head of the respective one of the test-takers, the method further comprising:
    monitoring, using a camera of each of the testing assemblies, an eye of the test-taker using the respective one of the plurality of testing assemblies;
    determining whether the eye of the test-taker using the respective one of the testing assemblies changed from a previous time or is no longer present; and
    stopping display of the sequence of the real displays for the respective one of the tests and fake displays on the display of the respective one of the testing assemblies when it is determined that the eye of the test-taker using the respective one of the plurality of testing assemblies has changed from the previous time or is no longer present.

9. The method of claim 1, further comprising:
performing a biometric evaluation to determine an identity of each of the test-takers using a biometric identification device of a respective one of the plurality of testing assemblies;
monitoring, using the biometric identification device of each of the testing assemblies, a biometric feature of the test-taker using the respective one of the plurality of testing assemblies;
determining, using a processor of each of the testing assemblies, whether the biometric feature of the test-taker using the respective one of the plurality of testing assemblies changed from a previous time; and
stopping display of the sequence of the real displays for the respective one of the tests and fake displays on the display of the respective one of the plurality of testing assemblies when it is determined that the biometric feature of the test-taker using the respective one of the plurality of testing assemblies has changed from the previous time.

10. The method of claim 1, further comprising generating the sequence of the real displays for the respective one of the tests and fake displays so that the real displays appear randomly within each of a plurality of consecutive groups of a common number of displays.

11. The method of claim 1, further comprising creating the fake displays to be visually similar to the real displays for each of the respective one of the tests.

12. The method of claim 1, wherein the step of decrypting, at each of the testing assemblies, the encrypted code to obtain the places of the real displays in the sequence of the real displays for the respective one of the tests and fake displays comprises utilizing a private decryption key in an electronics package in a housing of each of the testing assemblies to decrypt the encrypted code.

13. A method for taking a test, comprising:
obtaining biometric data, using a biometric identification device of a testing assembly at least partially in front of eyes of a test-taker, to determine an identity of the test-taker to take the test using the testing assembly;
receiving, at the testing assembly, the test from a source of tests based on the biometric data obtained by the biometric identification device, the test comprising real displays;
displaying a sequence of the real displays and fake displays on a display of the testing assembly visible by the test-taker;
receiving, at the testing assembly, an encrypted code providing, when decrypted, places of the real displays in the sequence of displays;
decrypting the encrypted code to obtain the places of the real displays in the sequence of displays;
controlling a light valve assembly interposed between the display and eyes of the test-taker based on the obtained places of the real displays in the sequence of displays to cause the light valve assembly to assume, when a real display is being display, a first state in which the test-taker is able to view the display through the light valve assembly and thus the real display and assume, when a fake display is being displayed, a second state in which the test-taker is prevented from viewing the display through the light valve assembly;
receiving responses from the test-taker to queries in the displayed real displays via at least one user interface of the testing assembly; and
sending answers to the questions from the testing assembly to be graded, wherein the grading is associated with the determined identity of the test-taker and a record of the test-taker with grades is created.

14. The method of claim 13, wherein the step of decrypting the encrypted code to obtain the places of the real displays in the sequence of displays comprises providing a private key unique to the testing assembly and using the private key to decrypt the encrypted code; the method further comprising:
housing the private key in a memory component in a housing of the testing assembly; and
encapsulating the housing in a chassis intrusion detector of the testing assembly that detects intrusion into the housing and causes erasure of the private key upon detecting intrusion into the housing.

15. The method of claim 13, further comprising:
obtaining biometric data of the test-taker of the same type that is obtained by the biometric identification device prior to administration of an initial test;
recording the obtained biometric data in a memory component for the test-taker; and then
generating a signal indicating that the test-taker is ready to take the initial test,
the step of obtaining the biometric data to determine an identity of a test-taker to take the test using the testing assembly comprising:
obtaining biometric data of the test-taker using the biometric identification device prior to administration of a subsequent test after the initial test;
ascertaining, based on the obtained biometric data, whether the test-taker using the testing assembly when taking the initial test is the same as the test-taker using the testing assembly when taking the subsequent test; and
when it is ascertained that the test-taker using the testing assembly when taking the initial test is the same as the test-taker using the testing assembly when taking the subsequent test, generating a signal indicating that the test-taker is ready to take the subsequent test to enable reception of the subsequent test by the testing assembly.

16. The method of claim 13, wherein the step of obtaining the biometric data to determine an identity of a test-taker to take the test using the testing assembly comprises obtaining an image of the test-taker's iris using an iris scan camera of the testing assembly and performing a biometric check on the identity of the test-taker based on the obtained image of the iris.

17. The method of claim 13, further comprising:
monitoring, using a camera of the testing assembly, an eye of the test-taker;
determining whether the eye of the test-taker changed from a previous time or is no longer present; and
stopping display of the sequence of displays on the display of the testing assembly when it is determined that the eye of the test-taker has changed from the previous time or is no longer present.

18. The method of claim 13, further comprising:
monitoring, using the biometric identification device of the testing assembly, a biometric feature of the test-taker;

determining, using a processor of the testing assembly, whether the biometric feature of the test-taker changed from a previous time; and stopping display of the sequence of displays on the display of the testing assembly when it is determined that the biometric feature of the test-taker has changed from the previous time.

19. A method for administering a test to a test-taker, comprising:

directing the test from a source of tests to a testing assembly being used by the test-taker, the test comprising real displays;

displaying a sequence of the real displays and fake displays on a display of the testing assembly;

directing, to the testing assembly, an encrypted code providing, when decrypted, places of the real displays in the sequence of displays;

decrypting, at the testing assembly, the encrypted code to obtain the places of the real displays in the sequence of displays;

controlling a light valve assembly of the testing assembly interposed between the display and eyes of the test-taker based on the obtained places of the real displays in the sequence of displays to cause the light valve assembly to assume, when a real display is being displayed, a first state in which the test-taker is able to view the display through the light valve assembly and thus the real display and assume, when a fake display is being displayed, a second state in which the test-taker is prevented from viewing the display through the light valve assembly; and receiving responses from the test-taker to queries in the real displays via at least one user interface associated with each of the testing assemblies;

whereby by evaluating the received responses from the test-taker, associating the evaluations with the determined identity of the test-taker, and grading the test, a record of the test-taker with a test grade is created.

20. The method of claim 19, wherein the step of decrypting, at the testing assembly, the encrypted code to obtain the places of the real displays in the sequence of displays comprises utilizing a private decryption key in an electronics package in a housing of the testing assembly to decrypt the encrypted code, the method further comprising:

encapsulating the housing in a chassis intrusion detector of the testing assembly that detects intrusion into the housing and causes erasure of the private key upon detecting intrusion into the housing.

* * * * *